(12) United States Patent
Merrien

(10) Patent No.: US 12,246,816 B2
(45) Date of Patent: Mar. 11, 2025

(54) MOBILE UNITS

(71) Applicant: Jean-Paul Merrien, Saint-Brieuc (FR)

(72) Inventor: Jean-Paul Merrien, Saint-Brieuc (FR)

( * ) Notice: Subject to any disclaimer, the term of this patent is extended or adjusted under 35 U.S.C. 154(b) by 0 days.

(21) Appl. No.: 18/278,492

(22) PCT Filed: May 2, 2022

(86) PCT No.: PCT/EP2022/061670
§ 371 (c)(1),
(2) Date: Aug. 23, 2023

(87) PCT Pub. No.: WO2023/213373
PCT Pub. Date: Nov. 9, 2023

(65) Prior Publication Data
US 2025/0051000 A1 Feb. 13, 2025

(51) Int. Cl.
| | | |
|---|---|---|
| *B64C 15/02* | (2006.01) | |
| *B62D 35/00* | (2006.01) | |
| *B63H 11/08* | (2006.01) | |
| *B64C 1/00* | (2006.01) | |
| *B64C 1/16* | (2006.01) | |

(52) U.S. Cl.
CPC ............ *B64C 1/0009* (2013.01); *B62D 35/00* (2013.01); *B63H 11/08* (2013.01); *B64C 1/16* (2013.01); *B64C 15/02* (2013.01); *B63H 2011/081* (2013.01); *B64C 2001/0045* (2013.01)

(58) Field of Classification Search
CPC .. B62D 35/00; B63H 11/08; B63H 2011/081; B64C 15/02; B64D 2033/026
See application file for complete search history.

(56) References Cited

U.S. PATENT DOCUMENTS

| | | | |
|---|---|---|---|
| 1,457,024 A | 5/1923 | Franzen | |
| 2,384,893 A | 2/1942 | Crook | |
| 4,919,364 A | * 4/1990 | John | F02C 7/042 60/225 |
| 4,967,983 A | * 11/1990 | Motts | B64B 1/02 244/30 |

(Continued)

FOREIGN PATENT DOCUMENTS

| | | | | |
|---|---|---|---|---|
| CN | 112689597 A | * 4/2021 | ............ | B64C 30/00 |
| JP | S63-279990 A | 11/1988 | | |

*Primary Examiner* — Brian M O'Hara
(74) *Attorney, Agent, or Firm* — H&I PARTNERS; Chai Im; C. Andrew Im

(57) ABSTRACT

Mobile units have the following inseparable sub-assemblies: a cylindrical outer envelope with low conicity or even constant section, one or more longitudinal fluidic channels, sensors, and one or more transverse fluidic channels. Each fluidic channel convergent at the inlet and divergent at the outlet to ensure the absorption of the entire frontal fluid vein. The motorizations are engineered for fluidic channeling design and each one controlled by the sensors fitted to measure differential pressures between external and absorbed fluid media. The transverse fluidic channels connected on demand, upstream to the high-pressure outlets of the longitudinal fluidic channels, downstream to pressurized boxes for vertical and directional movements. A set of volumes internal to the external fuselage envelope, not occupied by other devices of the mobile units, structured in technical operating sub-assemblies.

20 Claims, 6 Drawing Sheets

(56) References Cited

U.S. PATENT DOCUMENTS

| | | | | |
|---|---|---|---|---|
| 5,438,947 | A * | 8/1995 | Tam | B63G 8/08 |
| | | | | 114/337 |
| 7,048,229 | B2 * | 5/2006 | Sanders | F02C 7/042 |
| | | | | 137/15.1 |
| 7,509,797 | B2 * | 3/2009 | Johnson | B64C 15/02 |
| | | | | 239/265.17 |
| 10,704,466 | B2 * | 7/2020 | Dierksmeier | F02C 7/14 |
| 12,037,941 | B2 * | 7/2024 | Joret | B64D 15/04 |
| 2013/0256459 | A1 | 10/2013 | Barber | |
| 2016/0039477 | A1 | 2/2016 | Ahmad | |

* cited by examiner

MOBILE UNITS

RELATED APPLICATIONS

This applicatioin is a § 371 application of PCT/EP2022/061670 filed May 2, 2022, which is incorporated herein by reference in its entirety.

TECHNICAL FIELD OF THE INVENTION

The present invention relates to mobile units with motorized longitudinal channeling inlets, servo-controlled, optimized, with very reduced longitudinal drag, preferentially moving along their longitudinal axis and on varied trajectories, in particular transverse.

The mobile units are mechanical assemblies with increased mobility by their exterior and interior shapes, and by the integration of adapted propulsion devices whose efficiency is improved by the implementation of appropriate servocontrol. They are designed to be applicable to the majority of known comparable fields.

The innovations disclosed in this patent application relate to mobile units whose external and internal "fuselage" shapes are optimized in terms of the "pressure drop/displacement speed" ratio along their main longitudinal axis, which allow their improved evolution. in aeraulic or hydraulic or mixed environments; their characteristics of totally integrated motorizations and particular shapes are adapted to these environments according to the technical applications considered and are such that they allow a very clear improvement in the overall energy balance of their movements, by very significant reduction of the ratios "energy spent/distances traveled and/or overall masses moved", relative to the ranges of desired or planned operating speeds, compared to the performance of known mobile units in comparable fields of application.

Said mobile units, moving along their main longitudinal axis, are also remarkable for their performance in terms of reducing peripheral and frontal macromolecular disturbances generated in the fluid mass traversed:
  in an aeraulic environment such as air, and therefore in particular in aeronautics, and for mobiles moving on the ground, in "aerodynamic and sound traces (disturbances)" very significantly reduced,
  in a liquid medium such as water, and therefore for so-called "submarine" mobiles and for mobiles moving in a mixed "liquid and gaseous" environment, example "surface ships", in "traces (disturbances) very reduced hydrodynamics and noise.

The new hydraulic and aeraulic or aeronautical forms described and those deduced therefrom, for an informed professional, form an integral part of the present disclosed innovation and are expressed in the form of appropriate claims. Known mobile units "adapted" in accordance with the formulated basic claims are also described as being innovative.

Said innovative, claimed mobile units are designed to move:
  Preferentially on trajectories, based on their main longitudinal axis and on their extension by tangency effect, they are called "longitudinal"
  Secondarily on trajectories perpendicular to those defined above, they are called "transverse", or
  On complex trajectories combining those described below.

These so-called mobile units are in no way comparable to mobile objects belonging to the category of lighter-than-air mobiles such as airships and their derivatives because they do not in any way and in any case incorporate gas bags upward.

BACKGROUND OF THE INVENTION

Objects set in motion in a fluid homogeneous medium with high viscosity such as liquids or low viscosity such as gases develop a drag in which the energies expended to produce the movement of these objects are transformed into significant peripheral macro and micromolecular agitations, transferred in the surrounding fluid medium in the form of potential and kinetic energies that are difficult to recover; in practice they are recovered very little in terms of improving their energy performance.

In general, fluid flows of the "Venturi Tube" type are always seen for fixed, static external structures (see FIG. 1) which serve as a support for an internal fluid channel forming a first "fixed" external envelope, of shapes and sections variable or constant interiors, embellished with mono-form or multi-form objects, placed in the condition of tests in the fluid vein thanks to supports, whose aerodynamic or hydraulic behavior is studied with a view to their optimization of "forms-profiles" for correspond to one or more criteria (economic, speed, noise pollution, etc.).

In this context, the characteristics of fluid flows "disturbed" by said objects are studied, namely: viscosity, pressure, speed, temperature, etc.

The shapes studied in this way are either related to the flow conduit itself, the envelope forming the channel, or, more generally, related to the objects placed in these fluid flows so as to be able to measure the variations of their drags and the turbulence that they generate by their shapes by varying the characteristic parameters of the fluid flows knowing that these are interdependent according to the theories of fluid mechanics and the so-called laws of "similarity" in these environments (case of models in particular).

For the objects placed in the middle of the fluid flow for an optimization of their aerodynamic or hydraulic forms, the mechanical and dimensional components of the profiles materialized by these objects are modified and adapted as the stages of the experimentation progress towards the desired optimization.

All of the tests relating to the optimization of the shapes of objects in terms of minimizing their aerodynamic or hydraulic drag do not make it possible to "drastically" reduce these drags due to the fact that the pressure waves and the flows carrying those-these are generally "lost" in terms of energy, without seeking optimized overall efficiency, in the fluid or liquid mass of the environment surrounding the evolution of said objects, which can be studied in the form of models (scale models) of the objects "life-size" to be defined or improved, to be optimized in terms of fluidic drag.

Known mobile objects whose external shapes have thus been optimized, set in motion in their fluid operating environment, penetrate the fluid mass by displacing, in general, a fluid vein of section equal to or much greater than their largest frontal net section (examples: airplanes, helicopters, automobiles, boats, etc.); They generate pressure and speed waves in the surrounding fluid mass which, overall, translate into substantial energy losses which cannot be used, "recovered", in terms of noticeable improvement in the energy efficiency of the movement produced. Everyone can see firsthand, especially in hydraulics (e.g., boats), the formation of these turbulences and realizes the energy loss that accompanies them.

These mobile objects are developed in all areas of everyday life and are in constant or exceptional use, these are by way of non-limiting examples:-for hydraulics:

so-called "underwater" mobiles and propulsion objects in the category, e.g. underwater submersibles, underwater scooters, underwater research automatons, etc., with guided trajectories, for the essential, developed in an aquatic environment called "underwater"

underwater vehicles with internal passage such as U.S. Pat. No. 5,438,947 which describes a device with reduced or even very reduced drag; are not optimized because they incorporate only one motorized central passage of the fluid stream, which is not slaved to a detection of differential pressure between the admitted fluid and the surrounding fluid.

for aeraulics or aeronautics:

airplanes and in general all aircraft with internal propulsion, with the exception of "airship" balloons (see below), helicopters and similar flying machines, for example those called "flying taxis (Vertical Take-off and Landing aircraft, known as "VTOL"), whose trajectories followed are multidirectional, land mobiles supporting on the ground, rolling or sliding, powered by internal motorization, airships for which the objective of climbing capacities linked to the volumes of gas incorporated and stored lighter than air: Helium, or Hydrogen, . . . , in gas bags and the forms which result from this make these objects mobiles with "large displacement of the fluid medium environment" in relation to the "effective" proper masses to be moved. Despite their sometimes-innovative characteristics (U.S. Patent 20130256459), these mobile objects (airships) remain handicapped in terms of kinetic expression and cannot compete with either airplanes, even in their "upper atmosphere" or "stratospheric" version, or helicopters. In low or even very low-density environments, the supposed directional effects developed on these "airships" by known accessories and/or associative and/or constructive provisions declared innovative become inoperative or even "without demonstrated effectiveness"

For the associated hydraulics aeraulics so-called surface mobiles such as propulsion or towed ships and boats, "floating" on the surface of the water, displace volumes of water and air by creating a drag at the both hydrodynamic and aerodynamic but also a drag due to the formation of waves and swirls which are the result of an interaction between the liquid and gaseous media in contact, set in turbulent motion due to the displacement of said mobiles under the impulse of forces motors developed by internal motorization.

Object and summary of the invention

The object of the present invention is to reduce the energy losses significantly or even drastically for mobiles of the categories of mobiles mentioned above and proposes a set of families of mobile units intended to move in a liquid, gaseous or mixed fluid; these so-called new mobile units are presented as structured assemblies (simplified schematic examples-see FIGS. 2, 4, and 11) whose basic components are inseparable.

The invention describes mobile units, other than an airship, motorized, consisting of 5 inseparable sub-assemblies A, B, C, D, E:

A) an outer "fuselage" envelope, of larger section at the front than at the rear, or constant, preferably flattened on its ventral side, of a finite length greater than the greatest net transverse dimension of said "fuselage" outer envelope, B) a plurality of motorized longitudinal internal channels and at least one channel motorized internal longitudinal, remarkable in that said motorized internal channels longitudinally cross said mobile units, and are incorporated into the volume of the outer "fuselage" envelope, so as to ensure the internal circulation of almost "all the fluid" opposing the frontal movement of said mobile units, said at least one motorized internal longitudinal channel or channels each being equipped with one or more central internal motor propulsion devices, supplemented by upstream equipment and downstream equipment, controlled so that the speeds and pressures of the overall flow leaving said at least one motorized internal longitudinal channel are greater than the speeds and pressures of the incoming global flow, said at least one internal channel or said motorized longitudinal channels each presenting, successively, in the direction of the internal circulation of the transferred fluid, C) a set of input portions of convergent sections, a set of intermediate portions of constant section, and a set of final output portions, of divergent sections, an input portion of convergent section in at least one motorized internal channel, comprising:

"fan-compressor" devices in aeraulic applications or flow accelerator devices in hydraulic applications, differential pressure sensors between incoming flow and external surrounding flow, mounted on the front leading edge separating between surrounding flow and flow admitted into each of said motorized internal channels, an intermediate portion of constant section comprising:

one or more propulsive motorization devices, acting directly on the fluid stream channeled by each motorized internal longitudinal channel and positioned along the intermediate portion of each motorized internal longitudinal channel, an optional secondary longitudinal channeling envelope, which conducts internally, around each motorized fluidic vein, a concentric, damping flow, extending at least over the entire length of each intermediate portion of each motorized internal longitudinal channel, a final portion of outlet of divergent sections located downstream of each motorized internal longitudinal channel of the mobile units, extending from the outlet of the intermediate portions to the rear end of the "outer" "fuselage" envelope, and comprising energy recovery/sensor devices such as turbines and associated electrical generators, diffusers, and "fluidic parallelizers" of the flow(s) leaving the motorized intermediate portion(s) and of the flows channeled by the secondary channeling envelopes, D) a plurality of so-called "transverse" internal fluidic channels, non-motorized, connected, at the request of a means control, "upstream", to the motorized internal "longitudinal" fluidic channels, at the height of the outlet of their motorizations, or after the energy sensor devices, opening "downstream" into specific surface areas of the envelope "outer fuselage" to ensure a controlled distribution of flows picked up from the motorized internal "longitudinal" channels and to develop controlled thrust forces, called "lateral"; these "transverse" fluidic channels, linking in a completely internalized manner in the "fuselage" envelope, their "upstream" end and their "downstream" ends, have, on their paths, variable sections linked to the flow rate of the flows that they must drive, E) a set of "available" internal volumes between the outer "fuselage" envelope and the totality of the internal volumes occupied by the said motorized longitudinal internal fluidic channels and non-motorized transverse ones, and their functional equipment, structured in sub-technical sets for operating said mobile units.

More particularly the details of the different parts:

A: An external "fuselage" envelope 1, with low variation in section, generally decreasing slightly from front to rear, therefore of low conicity, even cylindrical, such that it absorbs by surface depression the maximum of the fluid masses concerned by the effects of peripheral laminar separations generated by the movement of said mobile units, and such that it only moves around it a minimum of surrounding fluid mass, with a minimum perimeter drag; these "fuselage" envelopes are of any cross-section, in particular other than circular and preferably flattened, or very flattened, or even flat on the lower so-called 'ventral' part, of finished length greater than the greatest net transverse dimension of said "fuselage" envelopes; the said very flattened external shapes, in the aeraulic field in particular but also in hydraulics, contribute, according to the speeds of movement, to develop on this said flattened zone in particular ventral, for an inclination at even a relatively low angle of the axis of the said mobile units on the axis of the trajectory followed, piloted, an overpressure with respect to that existing in the environment crossed, and by inverse effect an almost symmetrical depression on the opposite surface, dorsal, not symmetrical with the ventral surface, of the said outer envelope; the resultant of these opposing differential pressures (ventral and dorsal), applied to all of the surfaces concerned, in terms of resultant forces, from which the force of gravity must be removed, results in an upward effect which allows the said mobile units to move gradually uphill; and conversely if the angle of inclination of said unit on the axis of its trajectory is driven to become negative, said ventral and dorsal pressures are reversed and in terms of resultant forces, the upward effect becomes an effect of reverse thrust which adds to the force of gravity, contributing to the gradual descent of said mobile unit. In other words, the "fuselage" shapes described are able to develop a resultant force called "proper lift" such that said associated mobile units also have the ability to move perpendicularly to the longitudinal direction of penetration of said mobile units in the fluids that they cross. By way of non-limiting examples see FIGS. 3 and 4 "fuselage" shapes that allow the development of such lift forces.

Said mobile units, claimed, applied to aeraulics, in their flattened, very flattened or flat "fuselage" shapes on the ventral side, will present "incidentally", in longitudinal connection of the ventral and dorsal sides, 1—symmetrical extensions with a flat profile in progressive development, with horizontal edges, then gradually raised or lowered, extending the junction of the said faces by having a fine fin shape, called "winglet" whose length will extend from the front to the rear of said mobile units; they develop progressively from a zero value at the front (frontal section) until they reach their maximum value at the height of the rear termination of the fuselage envelope; these forms "added" to the outer fuselage envelope can also be declined as a retractable and retractable device. These "winglet" shapes attenuate the rotational turbulence of the "Vortex" type which is formed in particular at the tips of aircraft wings; they are therefore a useful or even essential technical complement for the definition of the external "fuselage" shapes associated with the new mobiles described.

These shaped fuselage extensions called "Winglets" for particular applications, are advantageously replaced by:

2—symmetrical horizontal extensions, in constant longitudinal profile, the cross-sections of which gradually reduce as they develop away from the main axis of said mobile units; they extend from the front of said "fuselage" shapes to their "rear" end; they contribute to the sectional frontal definition of the "fuselage" envelope into which they are integrated; when they are developed, they greatly contribute to the extension of the airfoils, in particular the ventral ones, which are used to develop aerodynamic lift effects, but also transverse forces perpendicular to the main longitudinal axis of the said mobile units. (e.g., element CPL in FIG. 11).

B: The outer "fuselage" envelope 1 with low section variation, described above, inseparably incorporates:

several or a plurality of internal "longitudinal fluidic" channels, e.g., elements 2C1, 2C2, 2C3, 2C4 in FIG. 4, see a single channel 2, longitudinally crossing said mobile units; these said internal channels are configured so that the sum of their "incoming-frontal" sections is equal to the frontal net section of the said mobile units and that the sum of their "outgoing rear" sections is equal to the net "back" of the "fuselage" envelope which incorporates them; these said longitudinal internal fluidic channels are all motorized to ensure the "certain", assured circulation, of the "totality" of the frontal fluid vein which would oppose the displacement of the said mobile units through the surrounding fluid medium, so that the speeds and pressures of the flows globalizing all the fluid veins leaving these said internal longitudinal channels, under the impetus of a set of appropriate motorizations, are greater than the speed and the pressure of the global flow entering the so-called internal longitudinal channels, the pressure measured in the frontal fluid vein presenting itself immediately at the entrance to these said internal longitudinal channels, under the impetus of the same set of motorizations, is constantly lower than the surrounding pressure Several or a plurality of so-called "transverse" internal fluidic channels, connected, in their "upstream" fluidic definition, on request, to the longitudinal fluidic channels, at the height of the outlet of their motorizations, in their "final downstream" fluidic definition at determined zones of the external "fuselage" envelope, in their "intermediate" fluidic definition, these fluidic channels connect in a completely internalized way, inside the "fuselage" envelope defined above, the two previous ends, these internal "transverse" fluidic channels, whose "upstream" supply is slaved to the request of the control of the constituted mobile units which incorporates them, allow "on demand" distribution, partial or total of the flows transiting in the channels "longitudinal" fluidics; their controlled, metered supply, according to the techniques implemented at their ends, developed on the surface of the so-called "fuselage" envelope, allows a controlled distribution of flows captured from the main longitudinal channels towards specific defined surface areas of the external "fuselage" envelope; these transverse fluidic channels can be subdivided from upstream to downstream of their internal path to each supply one or more points or zones of the surface of the external "fuselage" envelope.

The energy overcapacity stored in the global "longitudinal" flow leaving the longitudinal fluidic channels, compared to the energy strictly necessary to admit the totality of the frontal flow entering the said internal longitudinal channels, provided by the said controlled internal motorizations, gives to said mobile units real capacities to be propelled and therefore to move at speeds and accelerations which depend on the proper weights (mass) of construction of said units, on the fluidic resistances which they generate and on the resulting propulsive forces available.

said longitudinal internal channels, ex. element 2 in FIG. 2 or elements 2C1, 2C2, 2C3, 2C4 in FIG. 4, each successively comprise an inlet portion of convergent section adapted to the incorporation of "accelerator" devices and/or or compressors" of the "incoming" flow, an intermediate portion with a substantially constant section suitable for the fully internalized incorporation of propulsion (and/or motorization) devices and an outlet portion with a divergent section, suitable for the development of technical solutions allowing the control of the propellant flows at the time of their "rear" ejection into the surrounding fluid medium crossed.

These portions whose relative lengths can be variable and adapted, are designed with the possibility of being connected to each other inside the said mobile units themselves, and are connected to the "front" and "rear" sections of the external envelope to constitute:

several or a multitude of internal fluidic sub-channels, with optimized internal flow allowing the passage of the "totality" of the fluid stream captured by the overall "front" section of the constituted assembly, which fluid stream is conducted:
- either globally and preferentially up to its direct escape through the "rear" section of the same set of "longitudinal" fluidic channels
- either partially, and temporarily, in so-called "transverse" internal channels, the ends of which, in the form of nozzles, are arranged in predefined zones, perpendicular to the flattened ventral face of the said mobile units and incidentally to the extensions of this said ventral face, up to and towards communications with the surrounding environment.

Seen globally, said longitudinal fluidic channels are such that the sum of their cross sections in terms of fluidic continuity is, moving from the front to the rear of the associated "internal fuselages", first convergent, then substantially constant, considering the incorporation of said propulsion devices, then divergent. The fluidic continuity of the said channels regarding the variable sections assumed by their construction is such that the ratios of the said successive sections respond to the laws of fluid dynamics relating the data: flows, passage sections, speeds, pressures (Venturi effect), and temperatures considering the energy, dynamic, mechanical and/or thermodynamic contributions of the associated motorizations.

Said "transverse" fluidic channels are designed as internal derivations of the longitudinal fluidic channels, in fluidic flow intake, in particular after the motorization zones and are supplied by communication devices controlled and slaved to requests for transverse displacement; this communication temporarily reduces the "rear" fluidic transit rate of the longitudinal channels that supply them and therefore temporarily the "longitudinal" propulsive capacities of the fluidic channels concerned.

This technical particularity for intermittent use should be put into perspective with regard to the average demand for either horizontal or vertical movements of the said mobile units, noting that the vast majority of movements are "horizontal" or with a marked horizontal tendency and that the movements so-called "verticals" represent only a relatively small part of a movement seen in its entirety; this specificity, in the aeraulic field, applied to mobile units whose functionalities are comparable to those of helicopters or those of so-called VTOL flying units, allows a differential, controlled distribution of the total motorization power installed in said mobile units to ensure their mobility along their main longitudinal axis but also on trajectories which diverge from them or which are perpendicular to them by a direct effect of lateral thrust, developed by appropriate propellant fluxes, other than the lift effects mentioned above.

Said internal "longitudinal" fluidic channels, according to a claimed constructive arrangement, can be split into sub-channels of lengths less than or equal to the lengths of the three main portions, respecting the principle of fluidic continuity described above, to create specialized fluidics circulations that can serve as internal thermal, vibrational or sonic screens or shields to reduce the effects generated by internal propulsion devices. These fluidic sub-channels can also be used to guide part of the "incoming" flow as far as the third "diverging" part of said internal channels to constitute a sub-channel or a set of guiding sub-channels of a double secondary flow (known for improving the propulsive efficiency of so-called "reactors" in aeronautics).

These so-called longitudinal fluid channels, internally, are not necessarily independent from the inlet section to the outlet section; the flows they conduct can be mixed or dissociated through the action of slaved mechanisms or components, depending on the internal fluidic effects sought to optimize the overall operation of said mobile units.

The entries of these said internal longitudinal fluidic channels are such that the sum of their net sections is almost equal to the net section of the front of the "external fuselage envelope" described above.

The inlets of these internal longitudinal fluid channels, at the height of the most advanced section of the external "fuselage" envelope described above, are clear of any additional device for guiding the fluid vein(s) entering frontally into said mobile units, so that all the fluid concerned can penetrate it without generating lateral forces or turbulence which would be the translation of external effects of drag and undesired energy losses.

The divergence of the third part of the internal longitudinal fluidic channels is adapted to the incorporation of energy sensor devices and parallelization of the flow passing through and attenuates to tend towards zero at the level of the connection section of said at least one channel internal (or of said longitudinal channels when they are multiple) with the termination of the external "fuselage" envelope of said mobile units; this connection is tangential or quasi-tangential in order to minimize the turbulence between the ejected "crossing internal flows" and the "enveloping external flow", at this point of confluence (junction) at the rear end of said mobile units.

The outputs of said internal longitudinal channels are such that the sum of their net sections is almost equal to the net section of the 'rear' terminal part of the "fuselage" envelope written above.

The outlets of these internal longitudinal fluid channels, at the level of the most rearward net section of the external "fuselage" envelope described above and beyond this terminal section, are clear of any additional device for guiding the fluid veins leaving said mobile units. The devices for guiding the said fluid streams, at the time of their ejection at the rear of the said mobile units, are completely internal and participate in the development of the thrust forces by "non-axial" pressure and/or speed effects regarding the main longitudinal axis of said units, which thus contribute to the change of direction of said mobile units along an imposed trajectory.

The incorporation of so-called "transverse" fluidic conduits as described, intended to allow the development of transverse propulsive forces, does not in any way reduce the characteristics described of the so-called "longitudinal" fluidic channels. At the fluidic level, the supply of these so-called transverse channels, carried out at the "high pressure" outlet of the motorization devices, preferably after the energy "sensor" devices (e.g., turbine), is materialized by controlled "valves" at large fluid flows (ex.: element VGD in FIG. 11) which have the capacity, with minimal loss of energy, called "head losses", to guide, redirect all or part of the flows crossing them towards the inlet sections "transverse" fluid conduits. These valves can be, for example, with segmented lids driven by mechanical devices themselves driven by electric actuators, or pneumatic or hydraulic driven according to demand. These so-called valves VGD synchronized in operation with wide-opening valves mounted opposite each other, on the periphery of the "ducts" sheaths locally forming the longitudinal fluid channels; in the open position, they give off a large section of communication between the longitudinal fluid channels and the so-called transverse ones, while the above-mentioned lids obscure the fluid passage descending the longitudinal channels; the movements of these devices are synchronized in such a way that "fluidic shocks" (similar to those known as "water hammer" in a hydraulic pipeline) are avoided or very attenuated. The above-mentioned lids are also designed so that the flows transiting in the main longitudinal channels are slowed down to a minimum when they are not requested in "flow deviation".

C: In the mobile units known from the prior art (motor cars, boats, planes, for example), the fluid opposing the advancement of the mobile units is evacuated and deflected totally or mainly "around" the unit. mobile and thus creates a significant "dynamic drag" which results in a peripheral fluid expansion and a "rear" depression known as braking on progress. This therefore results in high energy losses and acoustic inconveniences depending on the turbulence and variations in pressure and speed created in the surrounding fluid medium crossed.

The innovative mobile units described propose to capture by a "controlled" fluidic depression effect, generated by internal flow accelerators, animated, actuated by an adapted, self-adaptive, efficient internal motorization, the "totality" of the fluid (fluid vein "front") opposing the advancement of the mobile units, rather than evacuating it by forced fluidic deflection around the latter, without however "significantly increasing" the frontal net section of the said mobile units and therefore the overall net cross-section of the said external "fuselage" envelopes, increased or not by those of the necessary aerodynamic components as described, which allow the optimal exploitation of the so-called "winglet" shapes and of the terminations of the transverse fluidic channels, in specific zoned surfaces developed along the external "fuselage" envelope with a constant or low taper section.

Thus, by capturing all of the fluid opposing the advancement of said mobile units and by passing the "total frontal" surrounding fluid through a plurality of said internal longitudinal channels (and at least one internal longitudinal channel), presenting a particular shape, adapted, allowing to obtain a fluid circulation close to that obtained in Tube known as of "Venturi", one improves in a very significant way, on a "longitudinal" trajectory the global energy and acoustic performances of the said mobile units:

On the one hand, in the surrounding fluid medium, said claimed mobile units only create a low, even very low external disturbance in compression and displacement of the external enveloping fluid layers whatever the speed of displacement, because:

The external "fuselage" envelope which defines them externally, of almost constant sections or in slight reductions of "front-rear" sections, produces only a weak (or even zero) peripheral drag.

The power of the internal motorizations, developed by propulsion units, is "self-adjusted" by servo-controls controlled via "pressure-depression" sensors (e.g., element CPA in FIG. 7) mounted at the level of the incoming section "front" and makes it possible, through the action of "fan-compressor" devices or high-flow "front" pumps, slaved, connected to the said motors, to avoid the external "front" discharge of the fluid opposing the movement of the say mobile units.

This innovative constructive particularity which avoids the formation of "front" and external lateral pressure waves independently of the speed of movement of the said mobile units, allows the construction of mobile units capable of overcoming the effects of compression waves. external "front" as noted, in the field of aeraulics, crossing the so-called "sound barrier" for a fluid traversed such as air. In addition, the constructive particularities of association of an external "fuselage" envelope of quasi-constant section, or with low longitudinal conicity, with motorized "longitudinal" internal fluidic channels, as frontal flow absorbers which avoid the external repression of this flow along and around the external "fuselage" envelope, which produce an internal global flow whose propulsive energy is increased, allow the constitution, the design of new mobile units whose drags of all orders are very reduced, see minimal.

The fluid masses admitted frontally, when they are compressible (the case in aeraulics-aeronautics) are compressed naturally (tunnel effect) and mechanically by the frontal "fan-compressor" devices to aid their admission, which increases their potential energy. This energy, combined with the motorization energies, is recovered in the terminal phase of fluidic transit, by mechanical capture ("turbine" effect) generally associated with fluidic decompression used as a "rear" propulsive effect at the time of the ejection of the fluidic vein in the surrounding environment.

The said claimed mobile units, designed to absorb the "totality" of the frontal fluid vein opposing their displacement, allow the design of (mobile) transport vectors, less energy-consuming and less disturbing (in particular in terms of noise) than those currently developed (e.g., aircrafts of all kinds, land vehicles, boats, etc.), the operating speeds of which can be improved, particularly in the aeronautical field with speeds greater than that known as the "sound barrier", without effect similar to the crossing of this limit by the mobiles known to date.

These mobile units with preferential "longitudinal and axial" movement, having real transverse movement capacities, cannot in any way be compared to "airships" known for their ability to move vertically, then horizontally while remaining handicapped by the very large sections of the gas bags they incorporate, which constitute known aerodynamic brakes.

On the other hand, the fluid captured by the "front" section of the said mobile units passes through several, or even one, motorized channels and comes out of them at a pressure and a higher speed than those it had at the entrance of said mobile units regardless of its own speed. As indicated above, the inlet, intermediate and outlet portions of the internal fluid passage channel(s) behave like hydraulic, aeraulic or mixed channels, forming an assembly of components which, overall, responds to the principle of "Tube called Venturi" and the fluids admitted therein are subject to the laws of fluid flows called Bernoulli and therefore to the laws of fluid flows at low, medium and/or high or very high speeds, in particular called "supersonic" applicable in aeraulics, whereas the said "front" pressure waves are completely absorbed by the said internal channels and cannot propagate outside the external "fuselage" envelope.

This or these longitudinal internal channels of successive converging then diverging sections are designed and profiled on the aeraulic or hydraulic plane, or in mixed flow (liquid-gas) to generate the minimum of internal losses of energy by effect of turbulence and to minimize the effects of cavitation according to the flow speeds of the fluid regarding the very nature of this fluid.

In aeraulic applications, according to a particular aspect of the invention, said propulsion unit(s) incorporate(s) acceleration equipment ("fan" action) and compression equipment ("compressor" action) (or high-flow pump effect: compressor and accelerator) of the fluid entering the upstream longitudinal "channel" zone of each propulsion unit.

The kinetic (velocity) and/or potential pressure energies developed upon entry into the first converging part of these fluid conduits by increasing speeds and pressures under the action developed by the incorporated propulsion units, which actuate a plurality of 'Flow accelerators and/or 'front' or frontal 'fan-compressors' (very schematic examples elements RC1-RC2-RC3 in FIG. 2 or element AF in FIGS. 6 and 8), which can be staged and therefore act in stages of velocities and/or pressure", are stored in the fluid penetrating into the intermediate section of said fluid ducts.

These energies are then increased by a new energy level under the direct driving action (e.g., thermal effect by combustion of propellants or other fuels, or propellers with progressive effect, etc.) of this or these propulsion groups (very schematic examples: element M) acting in the central part and whose effect manifests itself more particularly in the "rear" central part of these fluidic ducts.

This global energy acquired by the incoming flow, passed through the propulsion unit(s), is gradually released in the form of kinetic energy and/or decompression in the third divergent part of these "longitudinal" fluidic ducts by developing:

on a device of the "turbine" type, a "driving" force which is used to actuate directly or indirectly by passing through an "electric" or "high-pressure hydraulic" support, the afore-mentioned "fan-compressors" and all or part of the internal control devices (electrical, hydraulic, etc.) necessary to perform the internal functions, in particular the guidance and control of said mobile units, on the inner walls of divergent shapes of this third part, a resultant force of "counter-reaction" by decreasing pressure, and, on the peripheral surrounding fluid joined at their exit from the mobile units, a force of kinetic "counter-reaction" and pressure balancing, globally propulsive.

In hydraulic applications, said "flow accelerators" devices are "pump-turbines" which absorb in a controlled manner all the fluid from the "front" frontal zone. The propulsion groups act on a fluid which can be considered as being little compressible (see incompressible) and which cannot be brought into play in an exothermic reaction. The "forward" depression of the first converging part of the internal longitudinal fluid ducts will take place under the action of "pump-turbines" (e.g. propellers, etc.) actuated by one or more internal motor devices, with stepped actions acting in "accelerators-compressors" of flow (schematic example: elements AF1-AF2-AF3-AF4-AF5 in FIG. 5) (velocity and pressure) whose power is such that the frontal vein "front" of the surrounding fluid, opposing the advance of the said mobile units, or being "totally absorbed" by the "longitudinal" fluid conduit(s) implemented. The flow or flows sucked in and pushed in this way into the intermediate part of said internal "longitudinal" ducts are progressively at "high speeds and pressures" over part of the length imposed by the structural constitution of the mobile units; these intermediate internal "longitudinal" ducts can then themselves be equipped with propulsion devices (pump-turbines, screws, etc.) actuated by one or more internal motor devices (electrical, thermal, etc.), the same or different from those which actuate the afore-mentioned propellers, which increase at one or more points the speed and the pressure of the flow(s) passing through. The hydrodynamic quality of the devices implemented will be such that it will in no case create cavitation phenomena. In the third part, divergent from the internal fluidic ducts, the flow(s), output at high speeds and pressure from the intermediate sections of the longitudinal fluidic ducts, will be slowed down and depressurized in a flow "diffuser-stabilizer-parallelizer" which will minimize macroscopic turbulences, will reduce the speed and pressure gradients in such proportions that the total ejection flow at the rear of said mobile units will be controlled, in pressure relatively close to the surrounding pressure (minimization of ejection turbulence effects) and at a speed adapted to that desired to ensure, by "feedback reaction" on the surrounding outlet environment, the desired speed of evolution of said mobile units. The overall flow outlet section (admitted at the front, then accelerated, then slowed down) will be substantially equal to the inlet section so that all the ejected fluid vein contributes to the effect of thrust and speed sought in creating only a minimum of turbulence in the form of a turbulent drag which would be the result of poorly controlled energy dissipation. For certain hydraulic applications, said fluidic ducts as well as hydraulic propulsion devices will be built in an optimal search for minimizing mechanical and acoustic vibrations, so that the "hydraulic trace" signature of these internal devices is combined with the hydrodynamic quality of the external "fuselage" envelope. These constructive particularities, for certain applications, allow the development of new mobile units whose overall acoustic and vibratory trace tends towards a minimum.

For certain hydraulic applications, said longitudinal fluidic channels as well as the hydraulic propulsion devices will be constructed in such a way that part of the flow, put under high pressure by the afore-mentioned devices, is routed specifically into a so-called "hot" zone of the internal devices. of motorization and by heat exchange, increases its potential energy, in pressure and temperature, without phase change (transition to the "steam" state), which would generate turbulence, micro-cavitation and noise pollution. This specific so-called "heated" flow is, in the downward direction of its circulation, reinjected in an appropriate, diffuse manner, into the main downward flow, in the intermediate zone which immediately precedes the entrance to the third divergent part of the corresponding fluidic channel; it develops, by adaptation "progressive equalization of pressures and temperatures" and mixing of flows, an overall acceleration of this flow put to contribution to increase the propulsive effect produced in the third divergent part of said longitudinal fluidic ducts is internal. This flow mixing will be controlled in such a way as to avoid or minimize the formation of vapor bubbles which, under no circumstances, should still exist at the time of its final ejection into the surrounding flow (obvious loss of energy).

In hydraulic applications and in mixed media (e.g., air-water) the immediate, internal zone which precedes the fluid ejection into the surrounding fluid medium will be equipped with "internal" flow deflector devices, controlled by the said mobile units (examples elements P1 and P2); These devices develop non-axial forces which contribute either to the guidance of the said units (rudder), or to their lift-off ("foil" effect), or to their stability (dynamic anti-roll). Said longitudinal fluidic ducts, in their third, divergent part, will be designed so as to conduct the maximum flow ejected into the surrounding medium in its component whose "density-pressure" is the most important, that is to say the water, but also in the area where the relative pressure is the highest, therefore as deep as possible, while respecting the principle of parallelization of the longitudinal flows crossing, before their ejection into the environment surrounding said mobile units. For hydraulic applications of these mobiles, the "transverse" internal channels will be supplied, upstream as described above, with high pressure by valves with high flow rate and low pressure drop; the exhaust ends of these so-called transverse internal channels, developed in specific areas on the surface of the external "fuselage" envelope, will themselves be equipped with micro-valves whose opening is controlled by the detection of the level of the water; the entire device will be piloted in relation to the navigation commands.

According to a particular aspect of the invention, said internal longitudinal fluidic channels extend from the front to the rear of said mobile units, generally along the axis of movement of said mobile units without necessarily being "centered" at the right of the sections of the external "fuselage" envelope or strictly parallel in sections to the axis of this external "fuselage" envelope. Their inlet sections at the front of the mobile units are generally oriented perpendicular to the axis of movement of the mobile units so that the internal longitudinal fluidic channel(s) can capture the maximum, see "almost-all" of the surrounding fluid frontally opposing the advancement of said mobile units, (in principle: all this fluidic vein).

The internal propulsion devices that equip these mobile units will be sized so that the entire 'incoming' fluid stream is placed under depression "before" with respect to the pressure considered constant of the surrounding fluid traversed by said mobile units when these said units moving parts are accelerating or moving at constant speed. The principle of controlled "forward" depression of said mobile units is no longer necessarily put into action in the case of decelerations (decrease in speed) of said units. Said internal propulsion devices, without derogating from the principle of the absorption of the entire frontal fluid stream opposing the movement of said mobile units, will be optimized so as not to introduce into the internal motorization process according to the instantaneous speed desired that part or all of the incoming fluid admitted, the other part being nevertheless admitted, guided and channeled in secondary longitudinal fluidic channels, which are developed concentric around the main channels, to dampen the thermal, vibratory, sound and turbulence generated by the engines of the internal propulsion units and to participate, at their "downstream" end, secondarily in the propulsive effect by so-called double flow effect.

According to another particular aspect of the invention, said internal longitudinal channel(s), each, comprise, in their "divergent" output portion, a plurality of internal devices for parallelizing and/or stabilizing all of the fluid veins before their ejection in the surrounding fluid medium. These devices are in no way 'deported' outside the final divergent part of the said internal fluidic channels, nor deported beyond the final rear section of the body of the external "fuselage"; they cannot be compared in terms of efficiency to the conical devices claimed to be innovative (see. Patent "US2013/0256459 A1") which, made up of gas bags, in reality, "significantly" slow down the flow of admissible air and/or introduced into the internal channel of such "airships"; which devices are not claimed to contribute to the stabilization or the parallelization of the internally conducted flows in the said airships, which are not part of the categories of mobiles claimed by the present application.

The parallelization devices, described below, whose net 'material' section which hinders the passage of the flow is as small as possible (e.g., partitions mounted in the direction of flow of the internal flows), are presented:

at a first level, in the form of parallel, tight, adjoining ducts, of significant length sufficient to counteract the fluid turbulence which occurs at their entrance and to stabilize each of the unit flows crossing them and as a result the totality of the flow which passes through each said internal longitudinal channels, mounted for example in the form of "honeycombs" designed to resist the thermal effects: (e.g., Diffusers DF in FIG. 11), mechanical and vibratory effects developed on or in the fluid vein(s) by the or the propulsion units, then at a second level, sets of flaps mounted pivoting around axes (Simplified schematic example: elements AX1 and AX2 in FIG. 9) whose rotation is controlled by a central device for stabilizing the mobile units acting, at the exit of each crossing fluid vein, immediately before its ejection into the surrounding environment (elements P1 and P2).

These devices contribute to the parallelization of the longitudinal flow crossing and leaving the propulsion unit(s) to minimize the turbulent, vibratory, and overall sound trace of each outgoing fluid vein (element FS) expelled regarding its 'rear' penetration into the fluid environment (Ex.: element FE).

These parallelization devices also make it possible to optimize the "rear" thrust effect within the strict and total template of the outer fluid stream delimited by the rear end of the outer "fuselage" envelope 1.

The dimensions of these propulsion devices can vary so that the flow of fluid located in the center of the longitudinal channel(s) (for example in the case of a thermal engine, this is the most turbulent and hottest position) is controlled, and in such a way as to minimize the sound and vibration effects but also the environmental effects on the external fluid connected to the rear of the mobile units.

In the case of aeraulic applications, these effects are partly reduced by controlling the complete combustion of the fuels used, this being made possible by the relative, "adapted" length of the central section of the said longitudinal fluidic channels, dedicated to the motorization.

The internal longitudinal integration, claimed, of the motorizations in the central part of the said fluidic ducts described, implies, "in particular" in aeraulics, a significant lengthening of the zone of "thermal and exothermic reaction" of the motorization contrary to the effect of energy densification researched in the reactors and turbojets implemented on the aircraft in service to date "2020-2021". This elongation, claimed, makes it possible to minimize the quasi-"explosive" effects of exothermic reaction of combustion of the fuel used (e.g.: Kerosene or other propellants, or even "hydrogen"), to reduce the mechanical thermal and sound stresses developed while ensuring better combustion of the fuels used. This lengthening makes it possible, through its advantages, to make the integration of these motorization devices even inside the channeled longitudinal structures of said mobile units and inside the outer "fuselage" envelope "acceptable".

The proposed longitudinal "multi-channel" design, innovative, which consists in allowing the circulation of part of the fluid admitted frontally: that which does not necessarily participate in the combustion in the propellant devices, in one or more longitudinal channels concentric with the main fluid veins comprising propulsion devices, is used to control radial sound, vibration and thermal emissions around the integrated thrusters so as to evacuate the corresponding thermal and sound flows and effectively dampen their impact on the peripheral compartments and their transmission in the components that structure said mobile units around said internal longitudinal fluid conduits. Thus, in a relative and controlled manner, said mobile units are designed to neutralize the negative sound and vibration effects associated with the overall incorporation of the propulsion devices within said mobile units themselves. The design of said internal longitudinal fluidic channels will take in account the effects of differential expansion of the components implemented, in particular motorization, over the entire length, or a significant longitudinal part, of said longitudinal channels.

The internal termination profiles of said longitudinal fluidic channels are connected almost tangentially to the termination profile of the external "fuselage" casing to reduce peripheral turbulences at the outlet of said fluidic channels. This constructive arrangement is to be compared almost symmetrically with the claimed constructive arrangement of the leading edge of the front inlet of the fluid described below in this text. In order to reduce the fluidic shock effect of "rear" penetration of the internal fluid stream(s) into the peripheral environmental fluid in the terminal zone of the outer "fuselage" envelope, the profile of this terminal zone will be designed and adapted in order to minimize turbulences and sound disturbances in this specific zone, for example by presenting a "rear" profile different from a "net section" of the "fuselage" envelope by a perpendicular plane, but on the contrary close to a shape other than continuous and for example "sinusoidal" or "zig-zag" developed for example around either side of a secant generally inclined plane.

The relative lengths, the large net sections implemented in said mobile units in the divergent third part of said internal longitudinal channels, as well as the flow stabilization devices, make it possible to develop, at the extreme outlet of these said channels, a flow speed, pressure and temperature gradients that are much better controlled than at the outlets of aircraft engines in operation to date (2020-2021). Their controlled flows acting on the "entire net ejection section" in the "rear" surrounding environment, equal to the net section of the "rear" end of the external "fuselage" envelope, allows, for the "rear" end of each internal longitudinal channel, the development of an effective "rear" propulsive action zone close to 100%; this propulsive efficiency, of construction, applies to the whole of a mobile units which integrates several longitudinal fluidic channels.

Comparatively, known aircraft engines have a net thrust section, reduced at the "exhaust" outlet of said engines, or even very reduced, regarding all of the cumulative net sections of the "cabin/fuselage+wings+engines+empennages» of the aircraft they power. The differentiation of thrust zones and net sections (in particular fuselages) implemented on aircraft in operation to date (2020-2021) justifies the need for very high thrust zones at very high speeds whose temperature and pressure are very high, not controlled, with "not insignificant" levels of unburned matter, which generate notorious pollution, significant turbulences mixed with lift turbulences (Vortex at the wingtips), sound vibrations that are less and less accepted and tolerated from an environmental point of view, and the formation of water vapor trails (which crystallize at high altitude developed around the "carbonaceous and sulfuric" microparticles of unburnt matter), which are considered to be a manifestation of atmospheric pollution considered less and less 'acceptable'.

'External' or similar 'afterburner' type effects, known in conventional aircraft propulsion engines, can also be totally or largely eliminated in said claimed mobile units in view of the large net 'front' and 'tail' operated sections. In this sense, said propulsion units, fully integrated into the longitudinal structure of said mobile units, can, in "aeraulic" applications, be designed with the integration of control modules for the progressive and complete combustion of the fuel used.

In aeraulic applications, the fluid veins channeled at the entrance to the intermediate part of the internal longitudinal fluidic channel(s) which are not implemented in the process of developing the desired instantaneous power, are distributed in peripheral flow zones around of the internal longitudinal fluid vein(s) which participate directly in said motorization process. The distribution of the fluid participating directly in the motorization process is ensured by a set of specific internal concentric flaps (Schematic example: element 32 in FIG. 2) placed immediately at the entrance (e.g., element 31 in FIG. 2) of the propulsion devices, or staged the along the intermediate part of the internal fluidic channels in the case of "staged" engines, automatically controlled according to the instantaneous demand for power desired and at the same time as the injection of fuel into the engine process.

This injection, to allow complete combustion, will take place after an effective "preheating" of the said fuel placed at high, or even very high pressure, such that at the injection points, this fuel passes instantly from a liquid phase "under high pressure" to a gaseous phase "without liquid particles" to ensure optimum mixing with the compressed air admitted into the combustion chambers distributed along the intermediate part, with constant section of each longitudinal fluid duct. This gas phasing of the fuel at the very moment of its introduction into the combustion chamber, before the combustion reaction heat transfers take effect, prevents the reformation by condensation of fine droplets of fuel and therefore the formation of particles of unburned matter. This innovative particularity of "gaseous and very high pressure" exploitation of fuels, applied to engines as described and adapted to said mobile units developed in the aeronautical field, is claimed.

The theoretical shape of said outer "fuselage" envelope makes it possible to minimize the disturbances created by the displacement of the mobile units in the fluid environment and to minimize the induced pressure drops; it would be of constant section in the case of low relative speeds of movement of said mobile units in the surrounding fluid medium. However, practice, simulation and calculation show that, the more the relative velocities increase, the more the external laminar contact flows become important, gradually transforming into layers with turbulent flow which slow down the movement of such a mobile units. "In order to" minimize the effect of external expansion of these laminar flows becoming turbulent given the significant relative length of said external fuselages, the net section of this external "fuselage" envelope is gradually reduced from the front to the rear. of said mobile units to allow the progressive aggregation of new external fluid masses in laminar flow superimposed on those which would tend to become turbulent. This particularity (see FIG. 7) results in a very slightly "conical" shape, claimed, with progressively reduced sections, decreasing from the front to the rear of the external "fuselage" envelope (see angle Co).

According to a particular claimed aspect, the assembly participating in the birth of the internal fluid duct(s) at the real edge of the front of the external "fuselage" casing (see FIG. 7), that is to say the end located the most upstream of said mobile units, has a "leading edge" for the entry of the fluid into said internal longitudinal channel or channels having in cross section seen on a longitudinal plane parallel to the main axis of said mobile unit, an internal angle (Ex. angle A-1/2 in FIG. 7) as low as possible (ex.: less than 10° angle), adapted to the technology of the materials used between the outer surface of the "fuselage external of the mobile units and the corresponding input portion of said internal channel or channels. This/these leading edges, in the shape of a profile with an acute angle of attack of as low an angular value as technologically possible, are immediately extended by a supporting structure which ensures the progressiveness of the convergence of the first "incoming" part of each said longitudinal fluidic ducts and the "external" continuity in section of the most "upstream" part of the external "fuselage" envelope, (see angle Co).

Thus, the shape of the fluid inlet in the longitudinal internal channel(s) of the mobile units makes it possible to minimize the disruption of frontal penetration of the mobile units into the surrounding fluid mass. External air, hydraulic, or mixed drag generated by the front of the mobile units is minimal and is built to tend to zero (razor blade cutting effect). In order to reduce the effects of frontal compression at high speeds generated by this said leading edge or all of these said leading edges (multi-channel construction), in particular those appearing at the so-called passage of the "sound barrier"; the net front section of said leading edge may be designed other than perpendicular to the trajectory followed by said mobile units, that is to say, it may be inclined on its main longitudinal axis. The pressure waves thus generated in this zone are, because of such a constructive arrangement, more diffuse and progressive than those which would appear in a perpendicular arrangement. As a complementary improvement to this leading edge, not exclusive of the afore-mentioned arrangement, a construction of this leading edge in the form of an irregular curve, for example vaguely sinusoidal (or of a so-called "zig-zag" shape whose sharp angles would be attenuated), makes it possible to break the linearity, the continuity of the pressure zones that it generates and contributes to the attenuation of the effects, in particular the sound produced, in particular at speed "Mach 1" and at higher speeds. Digital manufacturing technologies in materials with high thermal resistance make it possible to design leading edge assemblies that meet these new design characteristics.

This said claimed leading edge, is also characterized to carry in its "upstream" part very close to the incoming and penetration section in the fluid medium: element 3, a set of detectors, one or more per channeling inlet, element CPA of which measure the differential pressures between the surrounding external flow and the internal flows of penetration in each of the longitudinal fluid channels, which allows, by internal servo-controls, or by automatic counter-reaction of detection of a pressure difference, to ensure a "permanent" depression in the "incoming" fluid stream with respect to the pressure of the surrounding fluid crossed, by acting instantaneously on the power requested from each of the "fan-compressor" devices, itself directly related to that requested from each of the internal motorization devices. This device, implemented globally in a longitudinal "multi-channel" mobile units, is "essential and fundamental" to the operation as claimed of the said mobile units because it gives them the guarantee of being able to develop a real ability to operate according to the principle of "total and guaranteed" frontal absorption of the entire fluid stream that opposes their displacement.

According to a particular claimed aspect, said mobile units comprise one or more propulsion assemblies acting directly or indirectly on all of the fluid passing through said internal longitudinal channel(s); said propulsion assemblies are optimally positioned in the said internal channel or channels, in principle from the end of the zone of maximum convergence of the channeled incoming fluid stream(s), in the central zone of the said fluid ducts, and ended at the beginning of the divergent part constituting the third part of said internal longitudinal fluid ducts. This constructive arrangement is in no way limiting as regards the relative operational lengths of the three base segments described; the constraints of vibration, thermal expansion, mechanical resistance to observed and developed pressures, sections necessary to ensure the passage of volume flows allowing the development of the expected driving forces and all considerations related to the technical and commercial operation of said units mobile are to be taken into account to adapt these segments to each other in particular in terms of their respective lengths.

The propulsion of a mobile unit consisting of several longitudinal channels (see FIG. 4) may be provided by several propulsion units, one or more per channel. The longitudinal fluidic channels which would not be equipped with propulsion units, in particular thermal ones, are nevertheless designed and claimed to participate in the absorption of the entire frontal fluid stream which opposes the movement of said mobile units at their inlets frontal and to make low pressure all areas considered "frontal"; the said fluid ducts which would not be thermally "motorized" like "reactors", are equipped, in this case, with flow accelerators and/or "front" fan-compressors actuated mechanically by a part of the driving force developed by the main propulsion groups equipping the motorized fluid channels, or by a driving force developed by the propulsion groups whose energy is temporarily stored in a form other than mechanical, for example "electrical" or "electrochemical" (ex.: batteries-accumulators) or hydraulics, via generators driven by the main motors (for example thermal and mechanical), which supply motors (electric or hydraulic) which actuate the fan-compressors of the longitudinal fluidic channels called "secondary", in this sense these said channels are motorized in "non-polluting" mode and participate in the overall propulsion of said mobile units. The fluidic channels (ex.: elements C2 and C3 in FIG. 4) can be directly, on the thermal aspect, motorized whereas the channels (ex.: elements C1 and C4 in FIG. 4) are equipped with flow accelerators fed on the energy aspect, for example electrical, by the propelling groups of the C2 and C3 channels. These constructive provisions are however combined with the controls described above which ensure the permanent depression of the front of each of the channeling inlets of the said internal fluidic channels and by globalization, by the frontal depression of the whole of the "front" frontal section of said mobile units. The so-called "secondary" longitudinal fluidic channels, described above, without "exothermic" motorization, more "peaceful" operation in terms of sound and vibration, developed in greater numbers than the main so-called "thermal" fluidic channels, contribute to the development of mobile units that pollute less overall in terms of noise emissions and fine particles emitted.

Depending on the level of energy storage capacity produced by the "exothermic" engines, which may be at its maximum before the start of a take-off phase, in the case of electric batteries, the management of the propulsion devices in their globality can be adapted in the take-off phase, so as to minimize the power demand oriented towards the exothermic engines to reduce the more "polluting" effects that they generate and to maximize the power demand requested from the engines, for example "electric. This innovative feature is claimed.

D: According to another major and essential aspect of the claimed mobile units, all of the volumes, cleared and available between said external "fuselage" envelope and said internal fluidic channel(s), longitudinal and transverse, seen as internal "fuselages", of which the sum of the sections varies according in particular to the pressures and speeds of the fluid which circulates there, is built and structured like a "compartmentalized useful space" (see FIG. 2) and not "like a reserve of gas constituting part of an airship".

The clearing of such spaces, for a person skilled in the art, is easily conceived due to the fact that the fluid vein absorbed "frontally":
  for a compressible fluidic environment, is compressed and driven at high speed, under increased pressure,
  for an incompressible fluidic environment, is only accelerated and driven at high speed under high pressure,
  in said internal longitudinal fluidic channels, in such a way that the sum of the sections of these fluidic channels which ensure its internal transit is less than the frontal inlet section and that the sum of the volumes occupied by these internal longitudinal fluidic channels is less than the volume global contained in the outer fuselage envelope.

The "unoccupied" volumes made up of sub-volumes thus made available is structured and optimized on the technical level to allow:
  the construction of a rigid support framework for internal mechanical connections between the components described, namely: external "fuselage" envelope, the internal envelopes forming the said fluidic channels whether they are longitudinal or transverse, the propulsion unit(s), and
  the structuring of all the other available and unoccupied volumes of this space into specific technical compartments necessary or usable (non-exhaustive list) such as: a pilot cell or trajectory control cell, one or more passenger compartments, one or more compartments for the transport of goods, one or more technical equipment storage compartments or one or more fuel or even oxidizer storage compartments, reception structures necessary for:
  the deployment of technical complements and/or accessories, retractable or not, such as:
    wings, landing gear, rudders, ailerons,
    devices deemed more or less essential according to the qualities of evolution obtained for these innovative mobile units,
    nozzles (elements TG1 and TG2 in FIG. 9) fed by the internal transverse fluidic channels and their derivations which conduct secondary flows placed "in lateral, punctual exhausts", controlled, distributed along the external fuselage, which allow the development lateral, punctual, controlled external forces which participate in the piloting of the said mobile units (e.g., see FIG. 09);
    "zoned" sets of so-called nozzles, fed directly by the secondary internal flows, conducted by the so-called "transverse" fluidic channels, specifically captured by devices slaved to piloting, from the outlet of the motorization devices, at high pressure, or fed by "pressurized flat boxes" CPP (ex. FIG. 11), acting as fluidic buffers, themselves fed by the so-called "transverse" internal channels CTV (ex. FIG. 11); these so-called "flat boxes" allow harmonization of the pressurized secondary flows and/or differential control by zone of these flows, particularly in terms of pressure. The "zoned" deployment of such "flat, pressurized boxes" devices on large surfaces adapted to the configuration of the "external fuselage" envelope, respecting the profile of the external "fuselage" envelope, allows the technical development of specific mobile units whose functionalities may be compare to those of helicopters and other flying mobiles such as "flying taxis" called "VTOL; for example (FIG. 11), on mobile units described to have a very flattened ventral face, see flat, such pressurized boxes developed on an optimized percentage of this surface allow the implementation of forces such as developed on "air cushions" whose efficiency can be modulated according to the powers of the flows admitted to it (in terms of flow and pressure); equipped in this way, said mobile units are able to perform a vertical takeoff and/or landing; on these so-called mobile units, the technical development of differentiated zones of pressurized boxes on surfaces at the average height of their main axis, or more broadly on so-called "lateral" surfaces CPL (ex. FIG. 11), makes it possible to generate lateral forces perpendicular to the main vertical axis of the mobile units, offset with respect to the latter, the effect of which results in a torque which engages a rotational movement of the body constituting said unit, the intensity of this torque depends flow rates and pressures of the flows engaged in said pressurized boxes to do so.

All this internal and external structure makes this type of unit, mobiles that can "in no way" be similar to light aircraft of the "airship" type or other, even if the global search for the minimum weight will support the technical development of these units.

Said mobile units are in no way intended specifically for stationary positioning in the surrounding fluid medium, they are designed to allow an improvement in combined technical performance, by exploiting internal flows, by energy transfer to these flows and acoustic and vibration control. implemented components; they are a new conception of known mobiles, other than airships, in their environment of evolution which are essentially air and water (ex: planes, helicopters, VTOL, boats, submarines, . . . ).

The mobile units thus constituted, in improvement of their energy performance, are equipped with complementary elements for stabilizing and parallelizing the fluid passing through them longitudinally, making it possible to control and stabilize the fluid flows at several levels, along the internal fluid conduits.

These elements, totally internal, can also have the role of participating in the guidance of the mobile units by acting on the trajectory of the fluids "immediately before" their exit or at the precise moment of their ejection from the internal fluid duct(s), by the effect of reaction on the surrounding environment, creating a controlled directional flow effect "not aligned" with the main axis of said mobile units, making it possible to partially control the trajectory that the mobile units must follow on an imposed route. These elements, through their ability to direct the flow or part of this flow leaving the internal channel(s), allow the development of forces contributing to the "forward-backward" and/or rotational stability of the mobile units as a whole (pitch effects or roll), such as an elevator; used in mobile units operating in a mixed "air-water" environment, they can be controlled, piloted by servos to control the gauging balance of the assembly of the entire mobile units ("foil" effect) in order to maximize the propulsive efficiency related to the entire mobile units (example: elements P1 and P2 in FIG. 5).

It should be noted that these controlled directional forces acting on the flow ejected in the rear section of said mobile units are vectorially added to the lift forces developed by their external "fuselage" envelope by their preferentially "flattened" or even "very flattened" shapes described above.

These so-called very flattened enveloping shapes will be exploited in particular in conjunction with the said "flat box zones" equipped with side ejection nozzles perpendicular to the main axis of the said mobile units, described above, fed in controlled mode by the said internal fluidic channels transverse; These said nozzle zones will be developed mainly in flattened ventral surfaces, and/or in specific lateral zones so as to increase the guidance capacities of the said units In one embodiment, said motorization device or devices, adapted to each motorized internal longitudinal channel, are elongated or have integrated motors, and are placed directly in the motorized "longitudinal" fluidic channel or channels or in compartments arranged laterally to this or those, said motorization device comprising for each motorized internal longitudinal channel:
  a "front" turbine, a pump, or a combination of these pieces of equipment to create, in an "incompressible" surrounding fluid traversed, an effect of "accelerators" of flows
  an "accelerator-compressor" acting on a frontal fluid stream entering at the front of each motorized internal longitudinal channel, for a "compressible" surrounding fluid, then, —an "accelerator" motor acting on the fluid stream in transit in the intermediate section,
  a "Turbine-diffuser-expander- and flow "parallelizers" acting on the fluid stream being ejected in the divergent outlet section.

In one embodiment, for aeraulic applications, such as aeronautics, said at least one motorized internal longitudinal channel or said motorized internal longitudinal fluidic channels comprise one or more "elongated" motorization devices, extending over almost the entire the length of the intermediate portion of said motorized internal longitudinal channels.

In one embodiment, said at least one motorized internal longitudinal channel or said motorized internal longitudinal channels, in the output portion, comprise a plurality of devices for adapting the flow(s) having participated in the motorization to optimize their propulsive efficiency "rear" by slowing down the fluid: "diffuser" effect, by parallelization of the fluid stream(s) in the "rear" ejection path, minimizing the "turbulent" and thermal energy losses; optionally, these parallelization devices, in application to hydraulic or mixed environments, can also be installed in the inlet portions.

In one embodiment,
A) the "fuselage" outer envelope of the mobile units comprises a plurality of motorized, substantially parallel internal longitudinal channels which may be of different lengths,
B) the frontal inlet section of the external "fuselage" envelope is equal to the sum of the frontal inlet sections of the integrated motorized internal longitudinal channels of a "multi-channel" construction and the said outlet section of the said envelope "external fuselage" is equal to the sum of the outlet sections of said motorized internal longitudinal channels.
C) the number of so-called "incoming" longitudinal channels is different from the number of so-called "outgoing" longitudinal channels allowing the intermediate flows of said channels to mix and be associated,
D) the internal longitudinal channels are subdivided either into secondary longitudinal channels whose corresponding controlled flows are used to contribute to permanent effects of thermal and/or acoustic insulation and/or ex: "double flow", or into channels "transverse" secondaries, connected on demand, downstream of said engines, which allow the development of lateral forces controlled on specific surfaces of the external "fuselage" envelope.

In one embodiment, the mobile units has a leading edge for the entry of fluid into each motorized internal longitudinal channel) or a set of leading edges for a plurality of motorized internal longitudinal channels); each leading edge is remarkable in that:
  the angle formed between the profile of the external "fuselage" envelope and the profile of the first channeling part of the motorized internal longitudinal fluid channel(s) is a minimum of 5 degrees,
  the front edge of this leading edge is not necessarily perpendicular to the longitudinal axis of the constituted mobile units and may have a non-linear, even sinusoidal profile.

In one embodiment, the mobile units comprises at least one compartment or a plurality of compartments provided, structured between said outer "fuselage" envelope and said channel or said motorized internal longitudinal fluid channels and said "transverse" fluid channels to form:
  a steering or trajectory control cell and supervision of general operation,
  specific technical compartments,
  all of these compartments are thermally, acoustically and vibratory insulated from the motors and internal fluidic channels in compliance with the applicable standards.

In one embodiment, the mobile units comprises an outer sheath "envelope", in which is fixed one or more incorporated objects, which can be motorized; said outer sheath casing, comprising:
  an outer surface defining the "fuselage" outer contour of said mobile units, and
  an inner surface of said sheath defining, with the outer surfaces of said known object or objects incorporated said inlet, intermediate and outlet portions of at least one motorized internal longitudinal channel;
  the motorization specific to the incorporated object participates in the acceleration and circulation of the fluid flow from the front of the internal channel formed to the rear of the latter by the energy supply of devices.

In one embodiment, said at least one motorized internal longitudinal channel comprises a plurality of successive inlet sections, forming sub-channels, arranged in an overlapping and stepped manner from the most upstream end of the object "B" incorporated, towards both said outer casing and the downstream of the mobile units which can go beyond the termination of the incorporated object.

In one embodiment, the mobile units incorporates, in part or all of its motorized internal longitudinal channels, "long", non-compact, soundproof motorizations, which directly or indirectly drive "turbines" which allow the development of electrical resources needed
   the indirect drive of the "front fan compressors",
   driving the totally "electric" motors of part of the internal longitudinal channels,
   the implementation of other necessary internal functions such as control devices and other technical functions, etc.

In one embodiment, the surface of the outer "fuselage" envelope comprises, in specific areas, flat boxes:
   fully integrated into the volume contained in the external "fuselage" envelope,
   pressurized and supplied, on demand, either by diversion of part of the outgoing flows, captured after motorization, at high pressure, conducted into the fluidic channels "transverse pipes", or by air boosters,
   provided with a multitude of fluid exhaust points, regularly distributed, each acting as a mini or micro-nozzle, which locally and globally develop lateral thrust forces which are apply to the whole of the said constituted mobile units.

In one embodiment, the mobile units is "without wheelsets", for take-offs and landings in vertical mode or in "slid" tangential mode, piloted, on a "pressurized" fluidic cushion.

In one embodiment, flat surface areas of the "fuselage" envelope, equipped with pressurized flat boxes described, supplied by the "transverse" fluidic channels described, whose flows controlled on demand, develop, over the whole of constituted unit, lateral, directional, distributed thrust forces, the combinations of which make it possible to effectively obtain effects of
   vertical takeoff, while the flows produced by one or more of the internal longitudinal fluidic channels are totally directed towards the internal transverse fluidic channels
   permanent guidance, by controlled activation of specific pressurized flat boxes,
   progressive transfer of propulsive power available in horizontal movement by controlled activation of motorized internal longitudinal fluidic channels not requested during take-off, or by progressive reduction of the flows implemented in the internal transverse fluidic channels and by controlled redirection of these flows towards the exit the motorized internal longitudinal fluidic channel(s) which produce them,
   permanent or impulsive adjustment of the trajectories traveled, by controlled activation of the entire device implemented for vertical takeoff and for omnidirectional guidance;
   the mobile units thus formed, claimed to be innovative, have capabilities in terms of omnidirectional maneuverability applicable in many fields.

In one embodiment, in specific aeronautical applications, in that the mobile units switches from a subsonic mode, to a supersonic mode, to a stratospheric mode then to a possible "suborbital" mode,
   by a progressive injection, in particular from the stratospheric mode, in the propulsion devices, of pure oxygen on board, or of an oxidizer other than oxygen, whereas in subsonic and supersonic modes the oxidizer, not on board pulsed in the surrounding flow traversed is the oxygen of the air, so that mobile units of the suborbital or space "launcher" type are freed from carrying oxidizer in the launch phases that consume the most oxygen.

In one embodiment, in specific embodiments, in that the mobile units is structured as an association of centrally controlled mobile units, made autonomous in stages, consisting of
   a central mobile units, for ultimate use, reusable or not
   mobile units laterally associated with the central mobile units, independent, mounted symmetrically with respect to the main axis of the central mobile units, detachable and recoverable,
   to form a mobile launching unit
   of a single-use module, detachable from the central mobile units, which can be a satellite, a space shuttle, whereas said central mobile units can be recovered, or
   from a transport cell at very high altitude such as "suborbital", integrated into said central mobile units, intended for rapid return to earth;
   these mobile units assembled in a single "launcher", claimed, are vertical take-off and landing in "slipped" mode on a pressurized fluidic cushion.

In one embodiment, the mobile units further comprises retractable, optional equipment, contained in the external "fuselage" envelope, such as:
   wings, rudders and ailerons and G),
   temporary support devices on the ground,
   sensors protruding from and outside the outer casing,
   specific motorized devices, retractable which allow the initiation of a movement perpendicular to the main longitudinal axis of said mobile units;
   device for temporary or permanent, total or partial protection of all the front entrances of said mobile units against objects carried by the incoming flow, automatically actuated under the impulse of an appropriate detector.

A complete range of totally innovative mobile units can be developed by building these mobiles based on the basic technical principles developed above, namely:
   Aircrafts of all sizes with one or more air passages (ducted, central, or lateral),
   Aircrafts and derivatives of all types (including low-powered drones and pseudo-gliders), of all sizes, with internal motors of all types (including partially or totally motorized in electric mode), for various uses, in particular military, commercial, tourism. The corresponding mobile units can be developed "with" or without load-bearing wings, or with "folding" or retractable wings in the main body of the claimed main fuselage, with or without so-called "elevator or directional" rudder type device.

Specific aircrafts whose trajectories develop mainly under the action of "longitudinal" so-called "rear" propulsive forces but also under the action of piloted and zoned "transverse" propulsive forces; these said mobile units:
   for their large amplitude "longitudinal" paths, are designed to have a set of channeling inlets and a set of propulsive outlets perpendicular to the longitudinal trajectories followed:
   for their "transverse" paths of lower amplitude, are designed to integrate a combination of so-called "transverse" internal fluidic channels as described whose outlets are parallel to their main longitudinal axis which allow the development of thrust forces perpendicular to this axis longitudinal, lateral, piloted which increase the transverse maneuverability capacities of said mobile units, making them comparable to helicopters and other "flying taxis" (VTOL); noting that, during these routes or trajectories, part or all of the power of the motorizations of the longitudinal channels is directed towards the supply of the internal transverse channels by means of "high flow valves DGV (ex. FIG. 11), for their course in combination of the two types of trajectories described above, by manual or automated piloting controlled by manual or calculated commands, the two sets of longitudinal and transverse channels are implemented simultaneously in optimal minimization of the drag, measured along the main longitudinal axis, of the specific mobile units thus developed.

These new mobile units are particularly remarkable in that, on the longest horizontal trajectories (most of journeys), their aerodynamic drag is very low compared to that produced by helicopters and flying taxis (VTOL) which incorporate rarely internal flow channeling devices that their engines develop. The proposed innovative transverse mode of propulsion only develops temporarily (vertical take-off or landing phases) or by ranges of change in altitude or direction, without the longitudinal "aerodynamic" quality being degraded. Indeed, on said units, the overall frontal fluidic inlet remains unchanged, the "rear" propulsive outlet is reduced, under piloted control VGD (e.g., FIG. 11), to supply the transverse internal channels, and the transverse propulsive outlets are developed without modifying the profile of the external "fuselage" envelope. It should be noted that this type of mobile units can be structured on a longitudinal "multi-channel" basis of which only some of these channels are built with the capacity to be connected to the said internal transverse channels in such a way that a reduced part of the potential of the global motorization installed can be applied to the phases of use of the transverse movements, therefore take-off and/or landing; the internal longitudinal channels put on standby during the phases of vertical movements are progressively brought into action to activate the horizontal movements, while progressively the supply of the transverse internal channels is reduced and the corresponding flows gradually take part in the longitudinal propulsion. This type of configuration, with motorizations specialized by groups of longitudinal internal channels, makes it possible to develop the said transverse movements with a non-polluting motorization, for example electric, while the longitudinal movements can be in electric or thermal or mixed motorization, adapted to the phase of the engaged movement. Thus, said units are designed to consider the specificities of the landing and take-off areas and the urbanized or non-urbanized environments of these areas.

A specific development of such innovative units, adapted to landing areas is possible by a design of partially immersible flat boxes such that in the take-off phase a first subphase of pressurization of these said boxes is planned during which the Water which would have been introduced therein is evacuated, before the engagement of the final detachment of the surfaces considered in contact with the aquatic environment, so that the mobile units considered does not carry away any useless liquid mass. Additional watertight devices will be installed in such a way that the exposed transverse fluidic channels are not submerged.

Boats and unsinkable units of all types and sizes, new or known and adapted with one or more water passage channels (channeled, central, or lateral, or enveloping a hull of predefined shape), equipped with one or more devices motorization, for various uses, in particular transport or attack (military), commerce, pleasure (tourism) may be designed under these technical points.

Boats designed with one or more channeled water passages already exist on the market; however, their design does not incorporate the principle of absorbing "the entirety" of the frontal fluidic vein, which opposes their advancement, nor the principle of the external fairing allowing the delimitation of the said frontal section concerned and the continuity, in almost constant external section or with low conicity, of this fairing in the form of an external uniform hull from the front to the rear of the said boats. The channeled passages used on these boats are with uncontrolled fluid exhaust, not parallelized, with strong or even very strong turbulences, in the surrounding fluid medium. The motorization devices of these boats, even adapted in terms of fairing as proposed, are not slaved to a frontal signal emitted by differential pressure sensors as proposed, mounted on the leading edge of the front main fluidic inlet, which makes it possible to maintain this frontal entry in "controlled" depression.

Mobile submarines of all types, of all sizes with one or more passages (channeled, central or lateral) of water, equipped with one or more motorization devices and the afore-mentioned parallelization devices, for various uses, in particular military, trade, tourism. It should be noted that, for a submersible unit whose outer hull is reinforced according to the intended operating depths, the addition of a peripheral envelope constituting the claimed outer fuselage does not necessarily lead to an equivalent reinforcement of the thickness of the said external "fuselage" envelope, that moreover the zones said to be equipped with pressurized flat boxes, supplied by the transverse internal channels, developed on the surface of said external envelope are not necessarily reinforced, but are only held in differential pressure adapted to the depth for which they must come into action.

But also:

"Non-flying" mobiles of all sizes comprising one or more ducted air passages (central or lateral), of which part or all of the self-weight forces are taken up by ground support mechanisms (e.g., wheels, skids, pneumatic supports 'type hydrofoils', magnetic supports, etc.) equipped with one or more motorization devices, for various uses, in particular military, commercial, tourist, comparable to Motorcycles, Motorized bicycles, Automobiles, Trucks, Buses, Hydrofoils, Passenger and/or freight trains (on rail or similar) whatever their modes of traction (thermal, electric, etc.) including trains mounted on so-called "magnetic levitation" devices or on cushions air, and including those, innovative, intended to circulate in depressurized ducts; the latter are designed to circulate in a low-density fluid vein but do not, however, incorporate motorized internal fluidic channels as claimed, which make it possible to improve their performance by reducing their main drag. These non-flying mobiles, to be assimilated to the described mobile units, are adapted and complemented by an external envelope in one piece or composed of several enveloping segmented elements, constituting one of the components of the longitudinal internal ducts channeling the frontal air vein captured by the movement of these so-called mobiles; they must also integrate a motor controlled by a frontal differential pressure signal which makes it possible to maintain a depression in the frontal zone of penetration of the mobile units into the surrounding medium, even if the latter is depressurized in advance.

A complete range of mobile units can be developed by constructing them by adding to a type of "classically known mobile" an external envelope conforming to the external "fuselage" envelopes described previously; the specific profile of the incorporated object (classically known mobile), without having to necessarily redefine the external shape of the incorporated object, will form with the "inner surface" of the external envelope attached, the structure of the said duct(s) or longitudinal internal fluidic channels constituting the new mobile units considered.

To fall within the scope of the claimed innovative mobile units and to be efficient, such mobile units must necessarily be equipped with specific devices, such as "flow accelerators" (denoted AF in the figures) making it possible to "significantly" obtain a "front" depression which guarantees that the lateral and peripheral external drag of said mobile units is very reduced or even almost zero. These devices, flow accelerators AF, will be either integrated inside the added "external sheath" assembly, or developed specifically in the known integrated and specially adapted mobile. These devices, flow accelerators AF must, in all cases, be slaved to a detection of the setting in depression "before" the entry of the internal fluidic channels by the integration of sensors or devices adjusting automatic reaction on the power requested from said flow accelerators AF. In this configuration, the servomotors of the flow accelerators are totally or partially disconnected from the motorization mechanisms which participate in setting the said vehicles in motion by resting on the ground, for example on wheels.

According to a particular embodiment claimed, the mobile units comprise a conventional mobile object (for example, an automobile), an airplane (extrapolated forms), a bicycle, a boat, etc.) around which is added a plurality of external sheaths participating to the constitution of superimposed fluid conduits, which can be longitudinally "offset" in their penetration into the surrounding fluid. Thus, a plurality of fluid circulation channels is formed around the incorporated object, so that the surrounding fluid medium in which the mobile units move is little, or even very little, disturbed outside the sheath "outermost" envelope. The fluid circulation channels between the initial "known classic" integrated object and the plurality of external sheaths forming an "envelope" assembly of substantially constant external section, which can also be of different stepped and staggered lengths, adapt to the profile's "front" and/or "rear" of the "known conventional" moving object thus adapted to optimize all the peripheral fluid flows, enveloping said known conventional moving object.

The principle of the invention can thus be easily adapted to be implemented on mobile objects of known and/or evolutionary shapes to be designed, to make claimed innovative mobile units.

Less efficient mobile units "supported on the ground", of the type of those described previously, by incorporation in an external envelope shape of almost constant or slightly conical section of a known conventional mobile units are related to the principle of the invention provided that the addition of said outer casing channels as much as possible the fluid which opposes frontally the movement of the globally constituted mobile units "while no specific device" contributes significantly to the formation of a "front" low pressure zone. The position sufficiently offset forwards of the inlet section of the external casing attached with respect to the front of the conventional incorporated mobile is sufficient, in aeraulic flow at relatively low speed, to pressurize and then accelerate the fluid zones generally interested in the movement of the mobile to create the conditions for a 'Venturi Tube' type flow at the outlet of which the accumulated kinetic and potential energies are restored in decompression and "counter-reaction" energies which contribute to better propel said mobile units. This "fluidic" energy supply is however not self-sufficient to the point of considering mobile units devoid of motorization devices as described which act as "thermo-mechanical" or electrically motorized accelerators on the fluid veins conducted in the said internal longitudinal channels.

Mobile units of this type, inspired by the claimed basic innovative principles, less efficient, are also innovative and claimed.

The implementation of a plurality of input portions, each opening into an independent internal channel or into the same main internal channel or into a reduced set (in number) of channels, in grouping of incoming channels, consists in forming a segmented internal channel input (Ex.: FIG. 8). The segmentation of the fluid inlet into the mobile units makes it possible to optimize the continuity of the fluid flows "as close as possible" to the "known classic" object incorporated, located in this structure of offset external "front" ducts, and superimposed or nested, and therefore to minimize the disturbances in the said internal channel(s). This segmentation also makes it possible to obtain a progressive channeling of the fluid whose operation is similar to that of a stepped or even concentric superposition of Venturi tubes. Mobile units of this type, in adaptation of the main model of mobile units described which incorporate the necessary motorizations, are also innovative and asserted.

DETAIL DESCRIPTION OF EMBODIMENTS

This innovation offers mobile units conforming to the description given in the previous pages, whose overall shape minimizes the "front" drags generated by their movements and the external peripheral drags, captures "virtually all" of the vein which frontally opposes their longitudinal displacement along their main axis, channels this fluid stream into longitudinal internal channels with optimized flow (with the 'Venturi' effect for example), under the action of one or more internal motorization devices, and restores the said fluid vein captured frontally in the surrounding environment in the form of "rear" flows ejected, accelerated, parallelized and propulsive with high energy efficiency and reduced vibrations (e.g., sound) nuisances.

The present invention disclosed relates to motorized, self-propelled, high-performance, fully structured and architected mobile units, between a rigid external "fuselage" envelope shape of constant external section or slightly tapered towards the rear and internal "fuselage" envelope shapes, channeling, constituting the said incorporated longitudinal internal channels, combined with each other which constitute sets with "inverted fuselages" capturing "the entirety" of the frontal fluid vein opposing their movement in the surrounding fluid medium in which they move in generating the minimum of peripheral fluidic disturbances and restoring a "rear" ejected flow of maximum section whose thrust is optimized. These so-called "longitudinal" internal channels are connected by controlled valves to so-called "transverse" channels which supply specific maneuvering devices developed on the outer surface of said "fuselage" envelope.

The present invention also discloses the constitution of most of the mobile objects including the aeraulic or aeronautical and/or hydrodynamic and/or mixed shape or shapes which are a simple or extrapolated materialization of the main basic shapes disclosed.

Figure 1:
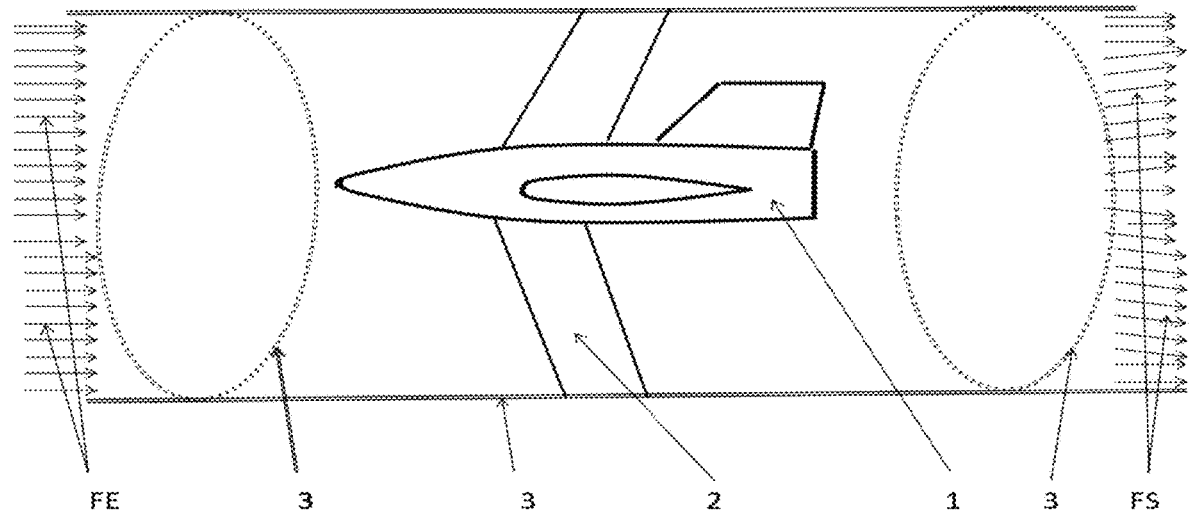
FIG. 1 shows a "classic aerodynamic test tunnel-Principle"
Figure 2:
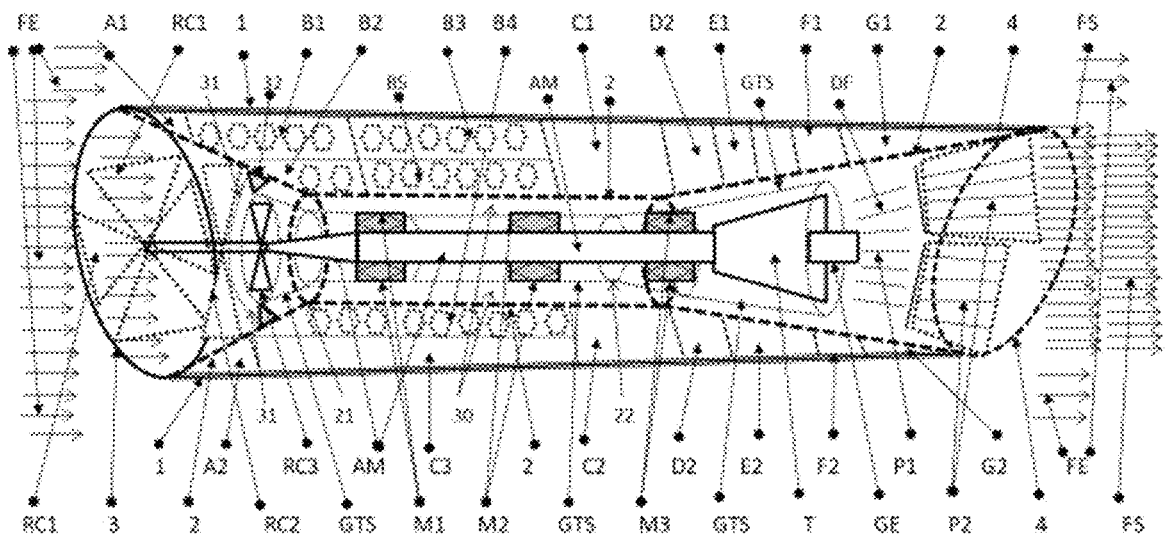
FIG. 2 shows a "principal diagram—motorized single-channel form, general diagram of the principle of mobile units/longitudinal sectional view.

The main novelty disclosed by the present invention, for the claimed mobile units, consists in incorporating in a new and inseparable way:
an external envelope forming a "fuselage" with a low or almost constant taper section and very low external drag, formed over the entire length of said mobile units,
several (or one) internal longitudinal, channeling "fuselage" shapes extending from the front to the rear of the said mobile units, called fluidic "channels", optimized, each equipped with
one or more propulsion devices, slaved to,
differential pressure sensors arranged at the edge of "front internal so-called longitudinal and external channels of the said external "fuselage" envelope,
several or a set of internal so-called transverse channels, supplied on demand by part or all of the said internal longitudinal channels from the high pressure zones of the latter, by means of controlled valves, which can be for high flow, globally constituting a new mobile unit ("very schematic representation of principle": non-limiting example presented in FIG. 2, in which the said transverse internal channels do not appear).

Said internal "fuselage" shapes serve as a support for one or more internal longitudinal fluidic channels which each of them is made up of three parts; successively from the front to the rear, the first is of progressively converging sections, the second is of constant sections, the third is of progressively divergent sections and are built in continuity of passage of the flow which crosses them.

Said internal "fuselage" forms serve as a support for one or more internal longitudinal fluidic channels, each of which is "motorized" by one or more propulsion devices (simplified and very schematic example: elements M1, M2 and M3 in FIG. 2) such as:
Under the action of the internal propulsion devices, the front of the said internal "fuselages" are generally and constantly under depression with respect to the pressure observed in the surrounding fluid traversed by the said mobile unit,
the internal fluid flows driven by the internal motor(s) M1, M2, M3, and the movement of said mobile unit respond to the principle of optimized fluid flows comparable to those observed in motorized "Venturi Tubes",
the external fluid flows, under the influence of the external "fuselage" shape with low, or even very low conicity, have minimal external drag even for displacements up to high, or even very high speeds given the progressively reduced section, the front to back, of these external shapes which minimizes the transformation of laminar surface flows into turbulent flows, Under the action of efficient internal propulsion devices, power-controlled to maintain a "front" frontal depression controlled by depression sensors, e.g., element CPA, the fluid streams captured at the front of the said mobile units are put into depression and speed by a "flow accelerator" device or a "fan-compressor" assembly (simplified and very schematic example: elements RC1, RC2 and RC3 in FIG. 2) in conjunction with the motorization device(s); they are in this way first accelerated and compressed to ensure their continuity of transfer in the said internal longitudinal fluidic channel(s), taking into account their initially convergent shapes, Under the action of the internal propulsion devices (simplified and very schematic example elements M1, M2, and M3), the fluid veins conducted in the intermediate part of the said internal longitudinal fluidic channels, contributing totally or partially to the motorization reactions (for example in the form of oxidizer, by exothermic reaction effect), are energetically propelled (increase in kinetic and potential energy (e.g., pressure)), by mechanical and/or thermal effects (e.g., combustion of a fuel or other combined), towards the descending part, diverging from the said internal fluidic channels, after a possible forced passage in a drive energy recovery device.

The fluid veins thus set in motion, develop on the walls of this third part of the longitudinal fluidic channels, diverging, pressure forces the resultant of which is a forward thrust reaction of the assembly of said mobile unit.

At the outlet of the fluid conduits, in their terminal zone, the fluid streams ejected into the surrounding medium at speeds and pressures greater than those of this medium develop, on a surface close to 100% of the "Rear" section of the "fuselage" envelope, counter-reaction forces on this medium, the resultant of which translates into a forward thrust of the whole of said mobile unit.

The fluid veins transiting in the divergent part of said longitudinal fluid conduits are stabilized on the directional plane by internal parallelization devices in order to transform the fluid energies of turbulence into propulsive energy, oriented in the direction of the fluid flow generally crossing the mobile unit. These rotational and vibratory stabilization devices for the turbulent fluid streams contribute specifically to minimizing the vibratory and/or sound impact of the fluid streams ejected at the rear of said mobile units into the surrounding fluid mass traversed and to maximizing their propulsive efficiency.

Figure 9:
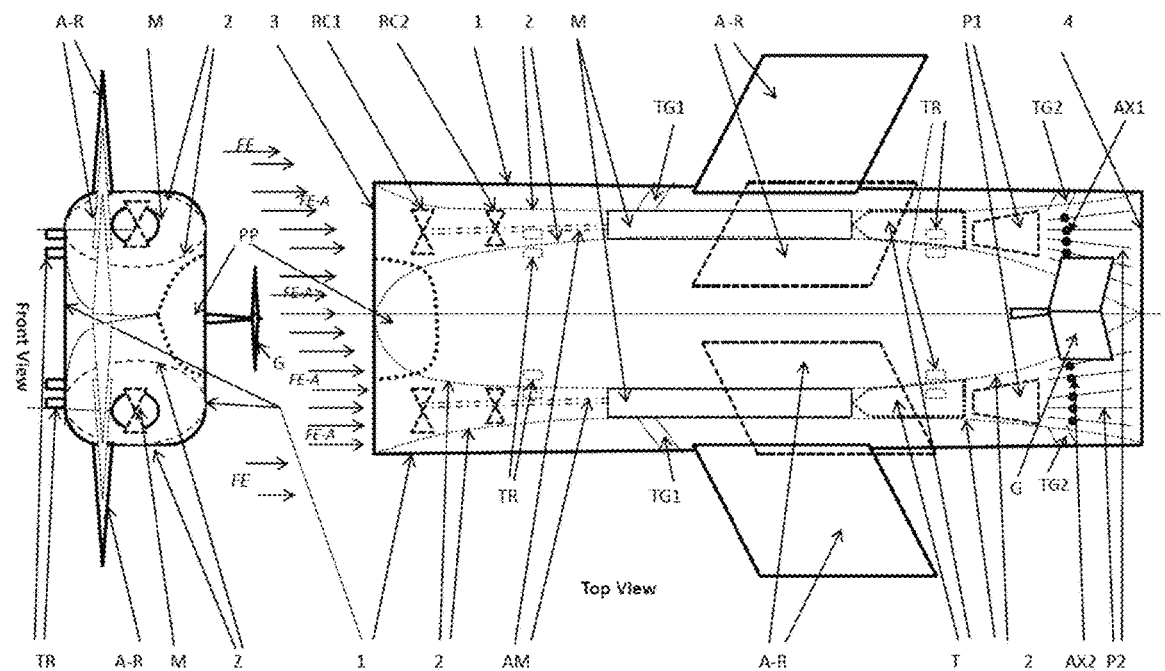
FIG. 9 shows "two-channel mobile unit of the "aircraft" type plus accessories"

The fluid veins being ejected from said fluid conduits are oriented by devices such as fins or mini-wings (e.g., elements AX1, AX2 in FIG. 9), see specific nozzles fed by the main propulsion unit(s) described or specific propulsion units with a specialized function suitable for guiding said fluid streams exiting from said mobile units, so as to generate on the rear of said units lateral guiding forces by counter-reaction on these guiding elements (fins or nozzles) and lateral backpressure forces on the surrounding fluid mass. These 'non-axial' forces are developed on demand by servocontrols in conjunction with the control device of said mobile unit.

Figure 11:
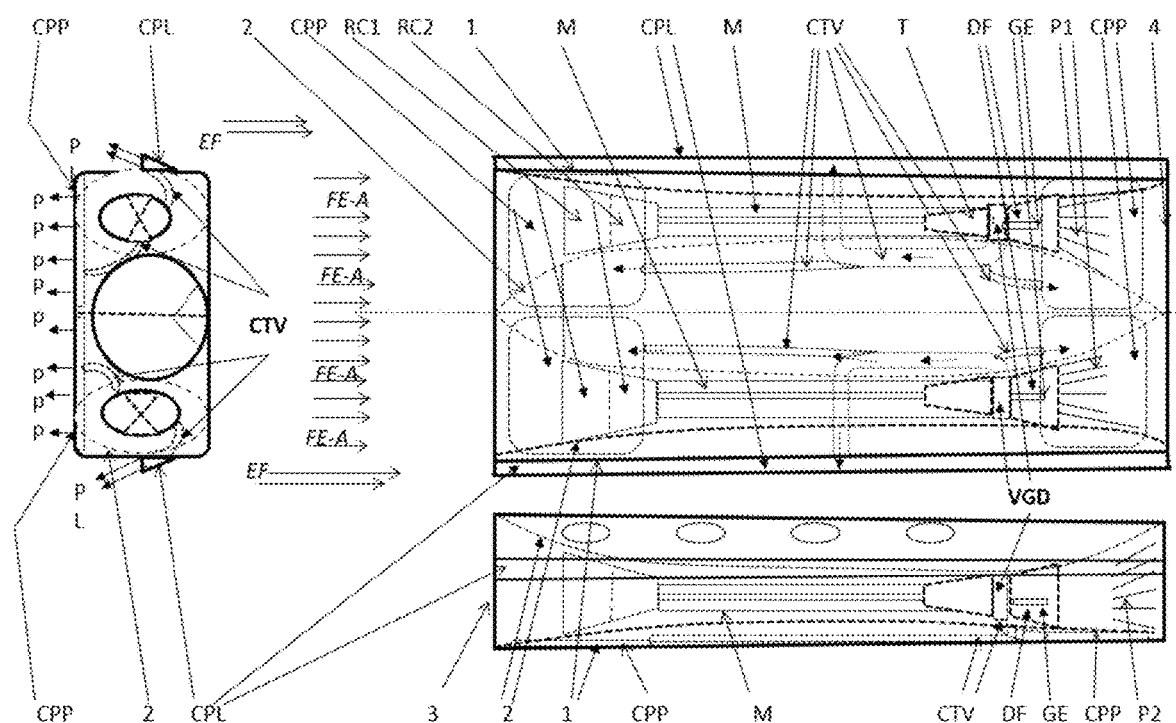
FIG. 11 shows "mobile unit of the type "aircraft with vertical take-off and omnidirectional guidance capability" with transverse channels".

The fluid veins transiting in the divergent part of said fluid conduits, in "aircraft" type applications, are contributory (in whole or in part) to the production of energy by actuating motive energy sensors which can be motors (ex.: turbines T, etc., "electricity generator" alternators, ex. element GE in FIG. 11) which are connected:

with the "fan-compressor" devices located in the first convergent part of the said internal fluidic ducts, with devices "energy accumulation" themselves in conjunction with "fan-compressors" located in fluid conduits whose motorization is other than thermal, for example "with electric motorization".

The fluid veins captured frontally are, as described, +channels of said mobile units, with a strong increase in potential and kinetic energies which are released in the third part. "rear" diverging from the internal fluidic channels for a return in the surrounding fluid medium marked by a controlled differential of pressures, speeds and turbulence on all the segments of the final "rear" section of the internal channels which adjust to the section "aft" of the "outer" fuselage, thus producing the development of "parallelized thrust forces acting on the entire aft section", which ensure the propulsion and mobility of the formed unit with increased efficiency.

The motorization devices described are known in their principle of operation; however, they are adapted by new constructive arrangements which improve their overall efficiency and allow their integration into a new overall structure of fluidic channels ranging from the "front" section to the "rear" section of said mobile units.

The second novelty disclosed relates to the specific external aerodynamic or hydraulic shape of the mobile units described.

The principle of this external "fuselage" shape consists of a set of profiles that are theoretically defined as follows:

Net "front" section: a plane, closed, any curve or an association of tangent or secant closed plane curves whose overlapping interior segments can be deleted so to retain only their outermost perimeter set.

Net "rear" section; a homothetic curve of the "front" section reduced by a few percent, parallel to it, constituting with the net section described above a support for the development of the external surface ("external fuselage") described below, External surface: that which is deduced from a continuous set of generatrixes which "lie" on the profiles of the "front" and "rear" net sections described above, perpendicular to the planes of the said sections, forming a continuous cylinder slightly tapered from the front to the rear, of variable section as described above, and of limited length and adapted to the intended technical application, the useful inlet and outlet sections of which are not necessarily flat, nor perpendicular to the generatrixes forming the outer envelope described above.

The so-called "upstream" and "downstream" sections for the same mobile unit are not necessarily identical, nor parallel, nor homothetic, nor homogeneous: a "straight" 'upstream' section can for example be coupled to a 'downstream' section "oblique" or "any"; the definition of the external "fuselage" profiles and the "upstream" and "downstream" sections of said mobile units are free and not interdependent and have constraints only with regard to the relative constancy of their external shape, to constitute a perfect cylinder or with low conicity, which contributes to minimizing the effects of turbulences generated at high speed by the de-structuring of laminar flows in contact with the external surfaces of said mobile units.

Figure 4:
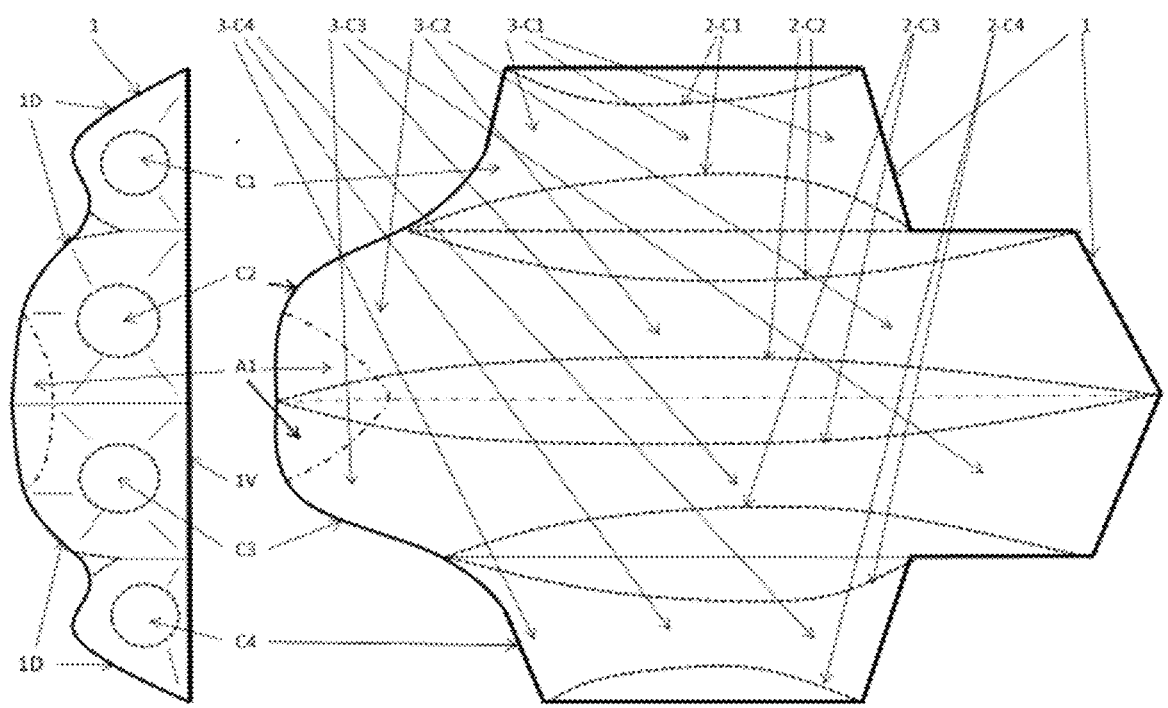
FIG. 4 shows "mobile 4-channel unit/front view and top view—principle"

The "fuselage" envelopes of the multichannel mobile units, whose lengths are different, are seen as an association of "fuselages" envelopes, each conforming to the definition made above, but of different lengths adapted to the fluid channels that they integrate (schematic example: FIG. 4).

These aerodynamic or hydrodynamic shapes define the external profiles of said mobile units. They are such that said mobile units constituted, moved in a fluid medium (gaseous or liquid) itself static or in motion, the turbulences generated by the contact of said external forms with the surrounding fluid are "macroscopically minimal" and that therefore their fluidic drag is minimal.

Figure 7:
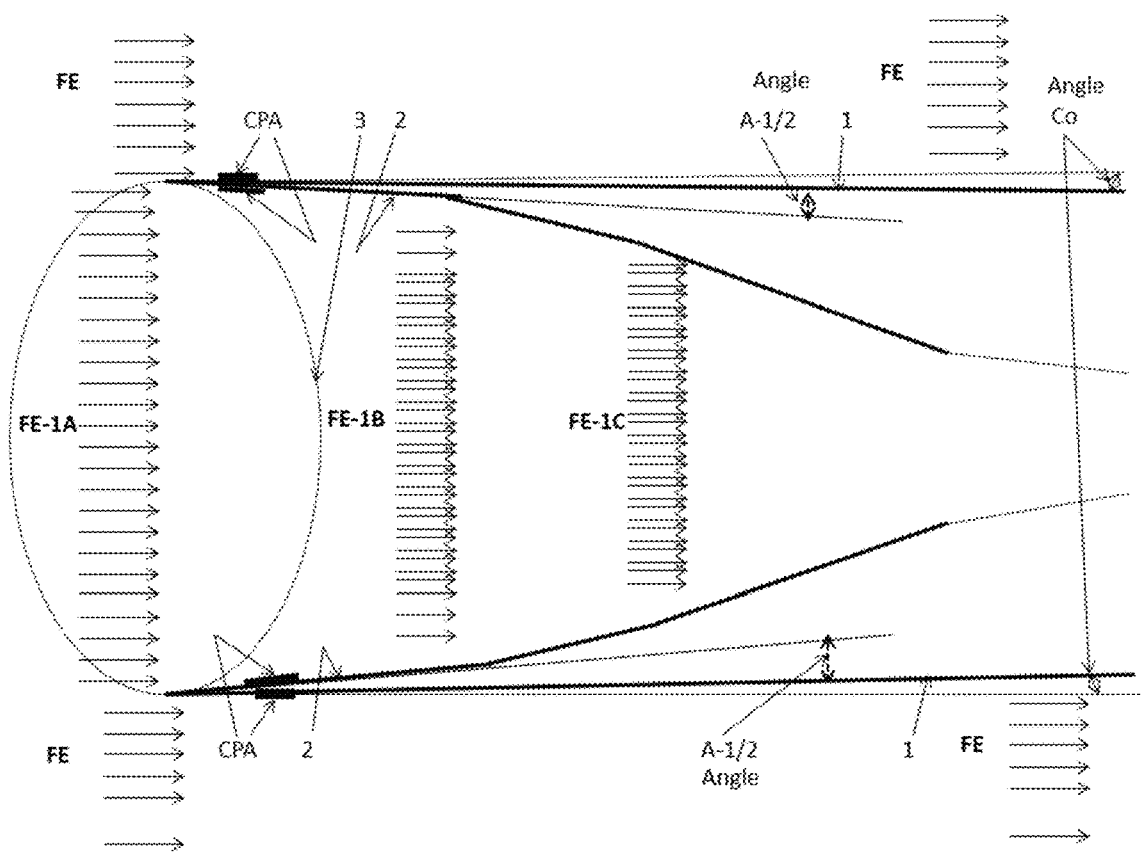
FIG. 7 shows "simplified representation of the front leading edge—principle"

The "front external" pressure effects developed by the displacement of said units are almost nil under the "front" depression effect generated by the internal propulsion device(s) described above ("front" fan-compressors) and depend on the 'aerodynamic' or 'hydrodynamic' quality of the leading edge of the 'front' section of said mobile units (see non-limiting example FIG. 7).

These leading edges are therefore profiled as finely as possible with a low angle of penetration into the surrounding fluid which respects the low conicity of the external shape described, and internally the first convergent shape of the channels to be equipped, they are therefore made up of the progressive beginning of the interior shapes of the said internal channels described. The angle of attack is represented by angle "A-1/2" between the outer envelope with low taper 1 and the beginning of the inner envelope, of an internal channel 2, junction segment between these envelopes. The profile of these said leading edges can be frontally as thin as a razor blade, backed by a substrate whose base widens to match the surfaces to be connected as indicated above.

In the development of aeraulic (aeronautical) and hydraulic applications, in order to increase the maneuverability characteristics of said mobile units, the external shapes of said "fuselages" envelopes of quasi-constant section or low conicity will preferably be "flattened", see "very flattened", going so far as to present a completely flat ventral face, so that they develop in the surrounding fluid medium crossed their own "lift" forces which are vectorially added to the "rear" thrust forces of the crossing flows when it is oriented on demand, "controlled", to follow an imposed trajectory.

In the aeraulic field (aeronautics), at low speeds of evolution in the fluid medium crossed, the claimed "fuselages" shapes, even flattened, could not develop sufficient lift forces to counteract the forces of gravity (which would lead to the fall of said mobile units). To overcome this technical difficulty, said claimed mobile units can be constructed.

Either with the incorporation of wings for increased lift which can be retractable Either with the incorporation at/in the said "ventral" face of the said units, of flat boxes, (see very flat or planes) pressurized and temporarily supplied by deviation of part of the internal flows, captured after motorization, at medium or high pressure, which are conducted through internal "transverse" channels described above; These so-called flat boxes are equipped with a multitude of fluid exhaust points acting as mini-nozzles whose overall action results in a "vertical" surface thrust (ex.: element P in FIG. 11), perpendicular to the surface on which it is developed and to the main longitudinal axis of the mobile unit; this surface thrust makes it possible to compensate for the lack of lift observed at low speeds and is also applied, as explained above, to develop new functionalities which make said mobile units usable in areas reserved for helicopters and other "flying taxis say VTOL".

In terms of motorization, the innovative particularity claimed for the mobile units described consists in incorporating the propulsion device(s) into the very body of the constituted mobile units and into the internal longitudinal channel(s) described, "by extending them on a significant part of the length of these said channels", or to integrate them into the volumes available along these said longitudinal channels by exposing there only the technical elements directly necessary for propulsion.

These new constructive provisions allow the separation of the "front" fan-compression", "combustion chamber", "rear primary diffusion-decompression" functions. The relative length of the internal fluidic channels, substantially equal to the total length of the said mobile units, is such that it allows the "longitudinal technical de-structuring" of the "known" reactors (on aircrafts) to adapt them to the innovative characteristics of the said mobile units. This longitudinal de-structuring allows, among other technical advantages, to improve the "combustion quality" of the oxidizers used:

by preparing the fuel used by putting it under very high pressure associated with a marked rise in temperature ("over-pressurization"), such that the injection of this fuel takes place only in the gaseous phase, without liquid micro-droplets, in such a way that combustion takes place without generating fine pollution particles, by multiplying and lengthening the combustion chambers, or even by distributing them over profiles, for example in a helix, such that the pressure waves developed by the combustion are progressive, non-planar, developing in a plurality of primary combustion chambers into which part of the "combustion" fluid is admitted after having been preheated in order to reduce the risks of re-condensation of the fuel placed in the gaseous phase, then into post-combustion chambers supplied with the rest of the full flow supplied by the central part of the main "longitudinal" fluid channels, by controlling the combustion turbulences thus produced by reducing them and reducing the sound effects generated (efficient and slower combustion, less explosive), which effects are softened by the fact that they are developed in a much longer fluidic column (effect of the 'gas ramp' type or of the 'torch' type).

The multi-channel constructive arrangement claimed makes it possible to envelop the main "longitudinal" channel(s) motorized by sub-channels (see non-limiting example element GTS in FIG. 2) which participate in the "damping" control of the effects mentioned above (thermal and sound): (see non-limiting example element 30) and with the desired propulsive efficiency, as in a known so-called "dual flow" reactor, in particular in longitudinal areas adjacent to and extending or surrounding the motorization zone(s) concerned by internal combustion reactions.

The technical, technological, longitudinal de-structuring of the known reactors operated, claimed, is made possible, by way of example, by a new architecture of the main motor shaft passing through the said reactors, which, instead of being monobloc, is multi-components, with axial failure (e.g., with elastic joints, etc.), or preferably physically dematerialized using technologies based on hydraulics or electricity (e.g., electric shaft, etc.); this technique makes it possible, among other things, to multiply them.

The large surfaces of the channeling inlets of the fluidic channels described can thus be segmented, and/or be exploited by covering multiple fan-compressors offset from each other axially and angularly. This technique avoids the construction of "front" fan-compressors of very large diameter, which are fragile and technically difficult to achieve.

The mobile units as described above, beyond the propulsion zone(s) described (intermediate part), receive, at the "output" of said intermediate zone from said internal "longitudinal" channel(s).

High-flow valves, optionally mounted, controlled, which allow by deviation of part or all of the flow propelled by the said internal "longitudinal" channel, the supply of one or more internal channels known as "transverse". These high-flow pilot-operated valves consist of covers mounted in articulated segments, driven by mechanical, hydraulic or electrical action devices and are built to generate a minimum of pressure drop, they are also coupled to side openings arranged in wall of the longitudinal fluidic channels which ensure, by their combined movements, the passage of the full or partial flow(s) from a longitudinal channel to one or more transverse channels.

Equipment "diffusers" of flow and "stabilization +parallelization" of turbulences in the outgoing flow as described below, before it is released into the overall mass of the surrounding fluid.

The "diffuser" equipment is mainly of the "Gas Turbine" type, known in 'aeronautical' reactors in operation and/or in electricity production plants. However, said turbines, applied to said mobile units which release, into the surrounding fluid, the flow(s) passing through it at speeds and pressures much lower than those compared with "conventional" reactors, operate over a wider range of speed variations, pressures and temperatures and are therefore more efficient in energy production; they mechanically drive, immediately in the descending direction of the flow, each an electric current generator incorporated in the center of the following "downstream" device (e.g., element GE in FIG. 11. In the second degree, these 'turbines', by capturing the potential energy of the flow which crosses them, by lowering the temperatures, speeds, and pressures of this fluid, necessarily release it in a state of uncontrolled turbulences, hence the need for 'parallelization' device descending in the direction of fluid flow, described below.

The parallelization devices are materialized in several levels following the direction of the fluid flows:

a) a) upon entry into the divergent end zone of said fluid conduits, immediately exiting the motorization zone (intermediate portion), or generally immediately after the "Turbine" device DF described above (see FIG. 11), by releasing in its center a circular cell for the aforementioned electric generator, by a "tight" structure, occupying the entire passage of the fluid stream in transit, built to resist the turbulences of the flow (at the outlet of the motorization devices or of "Turbine"), to the temperature gradients of the corresponding fluid, including in the transient start-up phases, and presenting only a minimal net "material" section facing the propelled flow; an example of construction of this type of parallelization device can be based on "honeycomb" type structures in Carbon or Carbon Fibers, b) a set of sets of fins, in particular, two sets, mounted perpendicular to each other, either fixed or controlled, controlled by the guiding functions of said mobile units, by directing the flow(s) at the outlet of said channels, immediately before their ejection into the surrounding fluid space, and "not" outside and after the termination of the external "fuselage" envelope, c) optionally, at an intermediate level between the two sets of fins described above, or at the third level immediately before the ejection of the fluid stream(s) into the surrounding fluid, a set of nozzles fed either by the main motorization devices, or by specific secondary motorizations. These nozzles are designed to be steerable and controlled in direction and in flow to significantly influence the direction of ejection of the main flow from each fluid channel. This optional device is to be considered according to the guidance modes retained for the "steering" of said mobile unit.

The result of the action produced, by all of these "Turbine +parallelizers" devices on the flow crossing the said internal channel(s), is to restore this flow with maximum efficiency at the time of its "rear" exit at the point of its junction with the 'external' flow, surrounding, enveloping said mobile unit. This efficiency is sought and developed on the following points: attenuation of "turbulences", and parallelization of the elementary fluid veins, reduction of "temperatures", and adaptation of the "speeds" and "pressures" of the flow crossing them before ejection.

Thus said mobile units are propelled from a surface equal to the entire "rear" zone contained in the perimeter of the external "fuselage" envelope, and it is obvious, for a person skilled in the art, to understand that the propulsive force necessary to maintain an "imposed, controlled" speed is obtained for an output flow of which:

the "effective" propulsive section is maximum, equal to the rear section of the outer envelope, the speed ejection is mastered, controlled, higher than the frontal entry speed, but relatively close to the speed imposed by piloting on the whole of said mobile unit, the pressure is higher but relatively close to the pressure prevailing in the surrounding fluid, (avoiding a detonation effect and therefore acting to reduce noise pollution), the temperature is as low as possible, taking into account the processes implemented, so that the loss of thermal energy "ejected" either minimal by in particular, the optimization of the double flow effect described, and the capture of energy by the drive of adapted turbines.

These operating conditions of the entire propulsion system proposed, set out above, make it possible to understand its effectiveness when it is incorporated into a mobile unit whose external aeraulic (aerodynamic) drag is minimal due to its envelope "external fuselage" with low conicity over its entire length (or of quasi-constant section), recalling that the 'front' frontal low-pressure zone is permanent and managed by the servo-control of the entire innovative device disclosed.

Complementary, innovative remote-controlled devices (as part of their incorporation into said mobile units) are used to control the stabilization and steering operations of said units in their conduct to follow an imposed course trajectory. These devices are connected on demand to the transverse internal channels described, which are supplied by the main longitudinal channels, their adjustable or fixed "fluid" outlets open out at specific points of the cylindrical external "fuselage" envelope with low conicity, to develop controlled lateral forces acting in trajectory or gyration orientation of said mobile units. (See possible non-limiting construction details, example elements TG1 and/or TG2 in FIG. 9).

Incidentally said mobile units, so that they are of increased maneuverability, by modifying their globally slightly conical external section, may be equipped with necessary or optional devices, appearing temporarily or permanently, projecting externally from said external envelope, in particular:

In aeraulic applications:

Lateral boxes incorporated into the so-called "ventral" face of the said units, even very flat or plane (e.g., element CPP in FIG. 11), pressurized and temporarily supplied by the transverse fluidic channels (e.g., element CTV in FIG. 11), developing "vertical" "surface thrust" which makes it possible to compensate for the lack of lift effect observed at low speeds, flat, pressurized boxes, identical to those previously described, developed on specific surfaces of the external "fuselage" envelope, other than the so-called "ventral" surface (e.g., element CPL in FIG. 11), which develop controlled, zoned reaction forces, perpendicular to these surfaces (e.g., element PL in FIG. 11), which allow use of the mobile units thus equipped in fields similar or close to that of helicopters and flying taxis (VTOL) with increased directional reaction capabilities in terms of power and maneuverability, without requiring the use of anti-rotation devices, wings which increase the lift of the said units in their journeys at low and/or medium speeds, trajectory control "rudder" type orientation wings or ailerons, ailerons and control of gyration effects of all kinds, mini-propulsive organs, supplied by the transverse fluidic channels, actuated by impulse or in a prolonged and controlled manner, with orientation and guiding effect or gyration movement control effect, components necessary for take-off or landing operations (e.g., wheel sets, etc.), sensors or tracking devices associated with radars or devices for taking images or video-surveillance of the environment upstream, downstream, and immediate of the trajectory, devices, when necessary, equipment and accessories adaptable by those skilled in the art in the aeronautical or fluidics field (non-exhaustive list).

In hydraulic applications and in a mixed environment (e.g., air-water):

most of the afore-mentioned equipment and accessories applicable in the field of aeraulics can be transposed into a hydraulic environment considering the specificities of these environments with high viscosity and density, incompressible, in which the components, "buoyancy" "in particular", linked to the density, "viscosity" linked to the speeds used risks generating cavitation effects, must be considered at all levels of design.

These fixed or retractable mounted accessories will permanently or temporarily increase the fluidic drag of the outer envelope of said mobile units without reducing their basic innovative character, by unclaimed associations.

Said mobile units described, without losing their basic innovative character, respecting the low conicity of the external "fuselage" envelope and the shapes of the internal fluidic ducts described:

can be equipped, internally, with all known necessary navigation equipment adapted to the possible fields of application (aeronautics, mobile on the ground, deep sea, and surface), will be built, in all the fitted and/or convertible volumes available, between the "external" fuselage and the internal "fluidic channel" forms, in technical spaces, which are in no way comparable to gas bags, which would have the function receive:

all the mechanical structural elements of the said mobile units: Main frames, Mechanical supports of the assemblies and internal components (these frames and supports include all the components from all the modern technologies adapted to the use made of the said mobile units), all the technical cells necessary for the management and development of all the motorization, guidance and commercial functions planned from their design.: the associated technical volumes, developed to architect said mobile units will be:

either attached to the structure of the defined external envelope and composed of one or more developed sub-volumes, nevertheless designed to integrate the structures dedicated to the constitution of the internal channels described, either made up of a single or several volumes placed in the center of the main tunnel, allowing all the fluid flow to pass, evenly distributed or not.

The volumes and shapes developed to constitute the internal fluidic channels are optimized so that their own "internal" hydraulic or aeraulic or mixed pressure losses (drag) are minimal.

The mobile units described, embellished with all combinations or associations of said fitted volumes, known and adaptable technical equipment and/or accessories, are innovative extensions induced in variants of the main basic innovations disclosed.

In schematic presentation of the innovation, without the following description of the simplified sketch presented in FIG. 2, simply by way of example of a "very schematic" mobile unit described moving in the direction indicated by the arrow marked "SD (direction of movement), cannot be considered as a restrictive or limiting version of the generality of the mobile units disclosed, evolves, in the environment medium FE, between the incoming flow FE1 and the exit flow FS, in reference marks:

1) a very schematic simplified example of an exterior "fuselage" shape 1, with a slightly conical section,
2) an example of a schematic, scalable interior shape, in the form of a "single" fluid conduit 2 (four points),
3) an example of inlet section 3, of the fluid stream captured by the front of said mobile. This section, by way of example, is rudimentarily shown in an "oval" shape, in cross section (not shown);
4) an example of outlet section 4 of the fluid stream ejected from the rear of said mobile;

A1: at the front of said mobile, with no imprint on the slightly conical outer "fuselage" profile, a very schematic representation of the piloting cell;

A2: a very schematic representation of the compartment serving as a flight path control cell;

B1, B2, B3, B4: a very schematic representation of 'Passenger' compartments;

C1, C2, C3: a very schematic representation of 'Freight' compartments;

D2: a very schematic representation of a technical compartment

E1, E2: a very schematic representation of technical fluid storage equipment compartments;

F1, F2: a very schematic representation of partitioned fuel storage compartments;

G1, G2: a very schematic representation of actuator control compartments allowing the operation of the equipment described in reference to "P1-P2";

P1: a very schematic representation of a set of "guides-diffusers"/flow "parallelizers";

P2: a very schematic representation of a set of mobile shutter elements/flow "parallelizers", pivoting around axes;

M1, M2, M3: a very schematic representation of the propulsion unit of the mobile, presented in the central position;

RC1, RC2, RC3: the propulsion system proposed makes it possible to capture all of the fluid stream entering from the front of the mobile and, to do this, can be fitted with 'front' "fan-compression" equipment, possibly stepped;

GTS: in the case where only part of the fluid vein entering the mobile is led to the motorization device, a perimeter fluid vein (element "GFA" or element "30") led by a sub-channel (element "GTS") for guiding the air admitted from the front of the mobile, serves as a heat and sound screen against the air vibrations generated by the motorization device and contributes to the development of a so-called "double flow" and post-combustion device;

T: a very schematic representation of a Turbine (sensor-motor), which directly or indirectly actuates all the internal equipment of the mobile unit constituted by the intermediary of an electric generator (element "GE" in FIG. 11) or hydraulic, coupled to said Turbine.

This figure does not show the "transverse" fluidic channels, nor the flat boxes connected to them.

The relative positioning of the components, devices and cells of all the aforementioned elements is in no way limiting or restrictive and in no way alters the basic functionalities sought, claimed in the context of their adaptation to the said internal channels and to all the mobile units formed.

Figure 3:
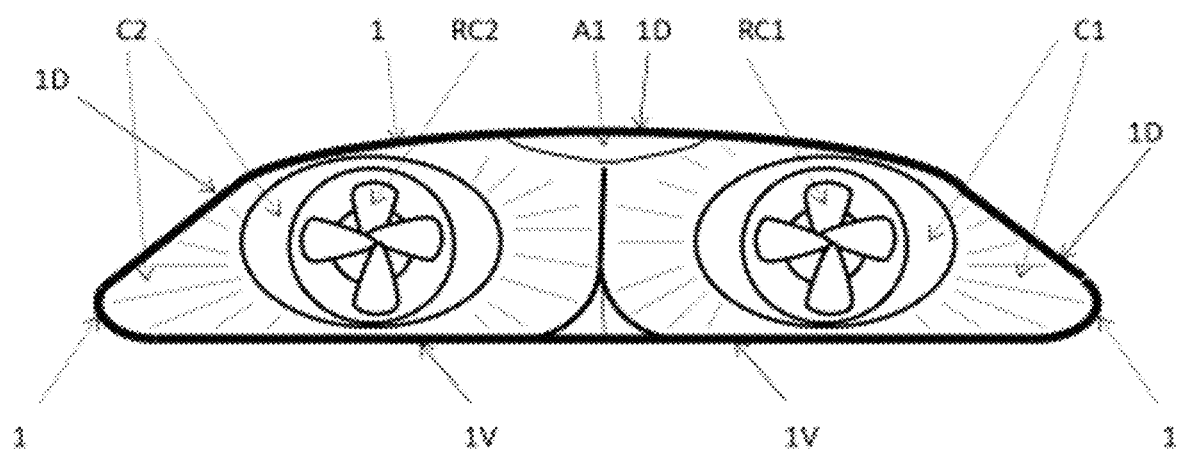
FIG. 3 shows "two-channel mobile unit/dual-channel shape front view—Principle"

In FIG. 3, is represented the "front" view of a mobile unit with an apparent section of "flattened oval" shape derived from the association of an "oval" and a quasi-flat surface, marked on the ventral side of said unit.

This type of association claimed makes it possible to obtain external "fuselage" shapes which, in aeraulics, "in particular", not only at relative low speeds, develop on the ventral face of the said mobile units pressure forces which are added to the depression "dorsal" forces.;

In addition to the schematic representation made by FIG. 2 and FIG. 03, FIG. 4 shows, by way of very schematic, non-limiting example, a mobile unit comprising several channels (four): two side channels C1 and C4 for the admission of the part of the frontal fluid stream facing these channels, each of these channels being equipped with a propulsion motorization device based on internal combustion, two central channels C2 and C3 for the admission of the part of frontal fluid vein facing these channels, equipped with all the devices as described in FIG. 2, including the devices: RC1, RC2, RC3, actuated for example by electric motors, without a device for thermal propulsion engine M1, M2 and M3.

The net "front" sections of the various "entrances" of the channels formed are not necessarily in the same frontal plane and can be offset as shown, by way of non-limiting example, in FIG. 4, the relative lengths of the various constituent elements of the outer envelope 1 are not identical and are adapted to the 'useful' lengths of the fluidic channels included; (this representation is in no way restrictive or limiting).

Figure 5:
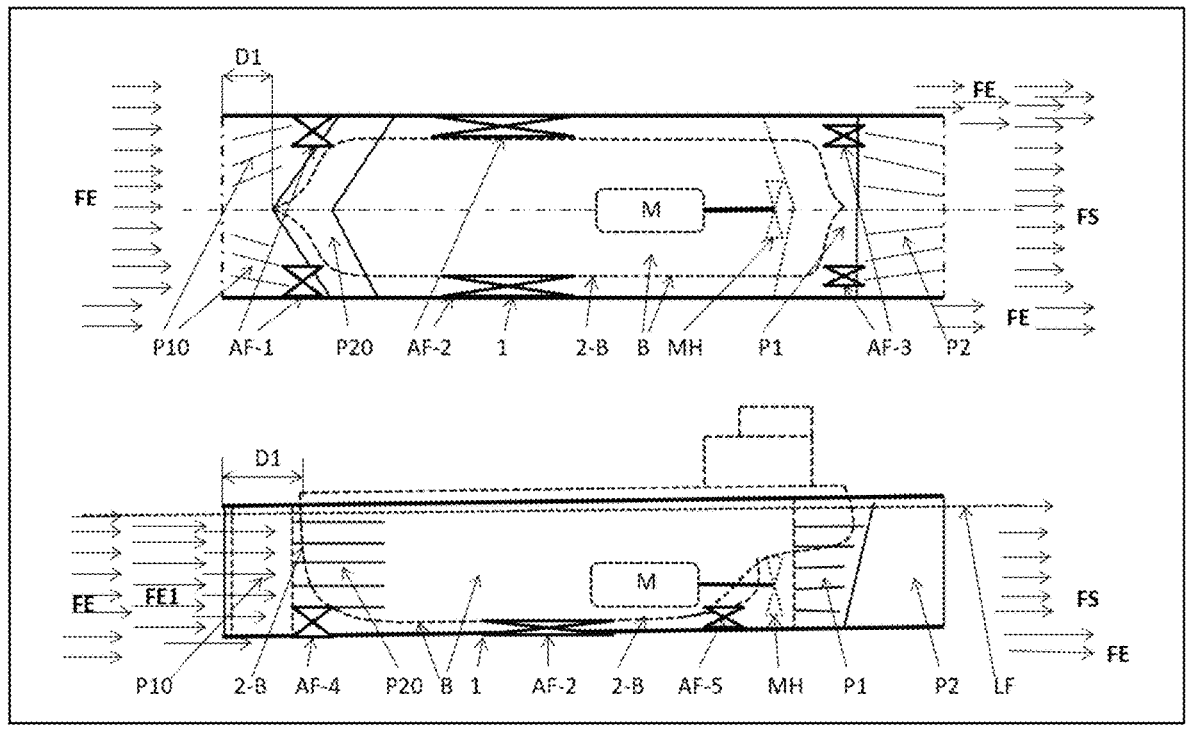
FIG. 5 shows "mobile unit incorporating a boat"
Figure 10:
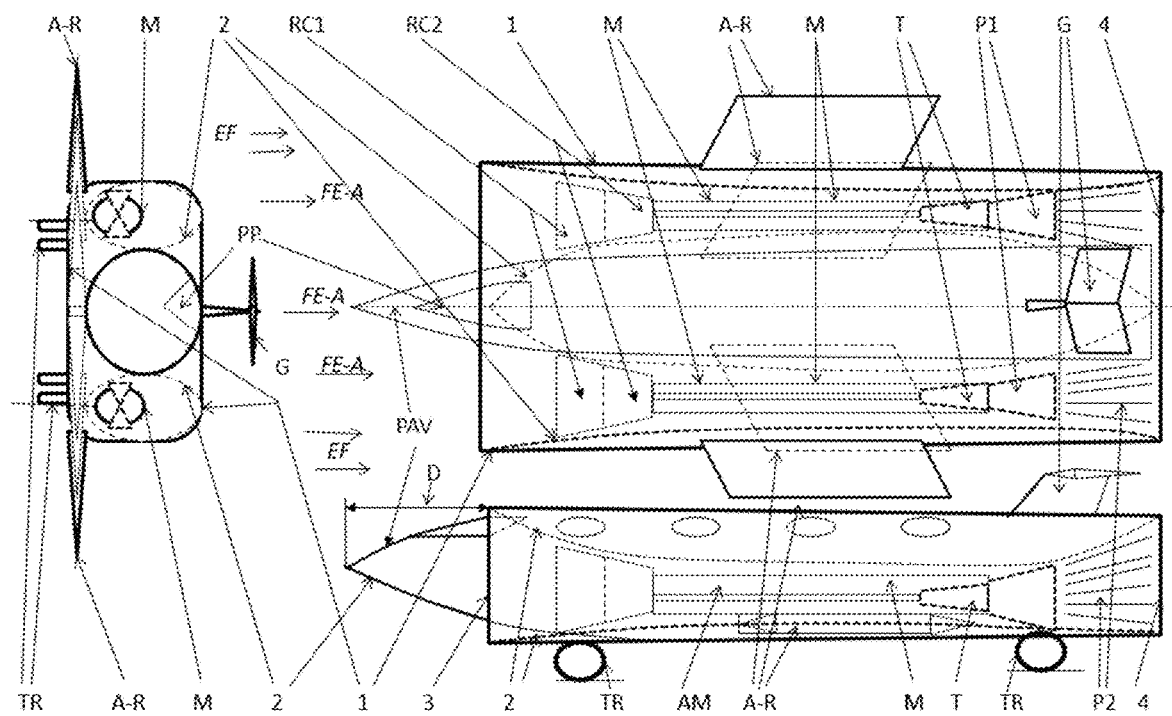
FIG. 10 shows "integrated "aircraft" type mobile unit (airplane)"

As an example of applications:

for the categories of "known mobile units" evolving in a mixed "hydraulic and aeraulic" environment such as ships, boats of all kinds including mono or multihull sailboats, jet-skis, the present innovation considered consists in adding to the hulls known of these mobiles a complementary shell, constituting the external envelope described, of "external section with low conicity", from the front of the mobile to the rear thereof, without these so-called "front" points or "rear", of the said known mobile units, are taken strictly by reference (see element D1 in FIG. 5, and element D in FIG. 10). The space cleared between the inside of this outer envelope and the outside of the conventional shell of a known mobile, materializes the tunnel external to it, channels the hydraulic and aeraulic flows concerned by the propulsive advancement of said mobile and avoids the energy dispersions of the drag effect in the surrounding environment (e.g., the waves that form from the bow of a boat).

Figure 6:
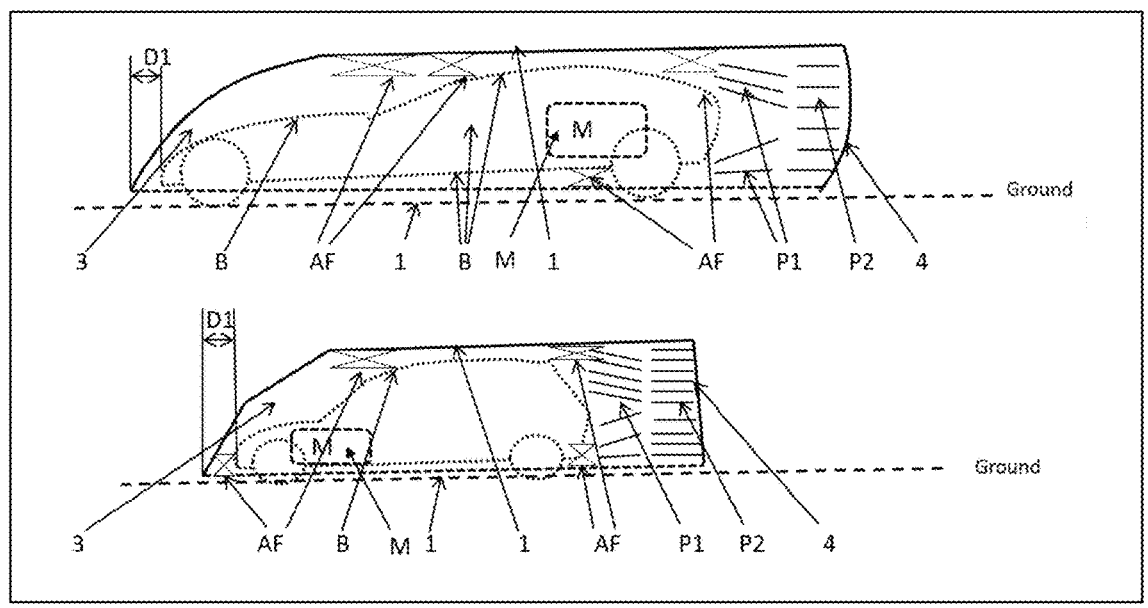
FIG. 6 show two versions of "mobile unit incorporating an automobile"
Figure 8:
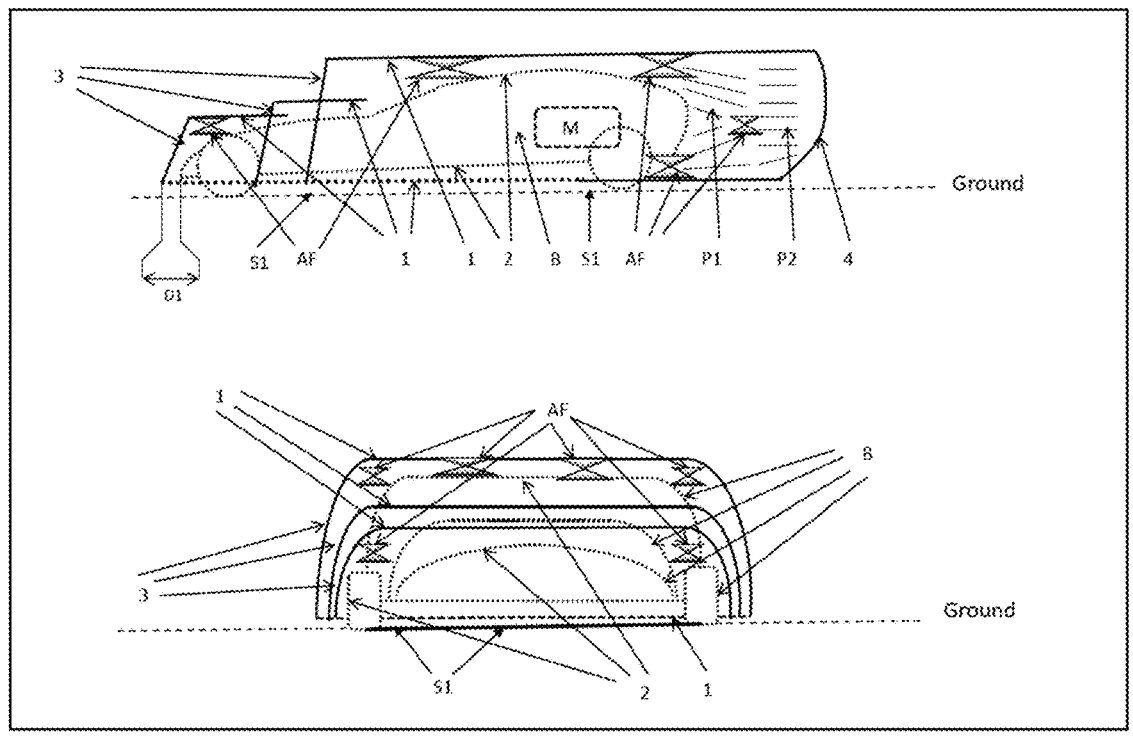
FIG. 8 show "mobile unit incorporating an automobile with stepped and segmented" channel" entrance.

In order to ensure convergence of the flow entering said tunnel, which can be subdivided into a plurality of independent and/or interconnected channels, it is necessary to generate a significant "front" depression in said "entering" fluid stream using devices AF, flow accelerators, as shown on the attached "principle" sketch drawings (ex., FIGS. 5, 6 and 8). These devices AF, for "front" depression of the frontal fluid vein, can be slaved to the permanent measurement of the pressure differential maintained between this "incoming" fluid zone and the surrounding external fluid medium crossed (see sensors CPA in FIG. 7). These devices AF can also be adapted to ensure a permanent and regular depression along the so-called intermediate parts of the said longitudinal fluid channels and allow the optimized supply, under increased pressure, of the entire fluid flow conducted, itself being able to be subdivided, to the entrance of the third divergent part of said fluid conduits. The entrance to this third part can be fitted with one or more conventional propulsion devices, (e.g., boat "turbine" propeller; see element MH in FIG. 5) and powered as indicated above by one or more fluidic channels or sub-channels. In the descending direction of the flow, this third part of the fluid conduit(s) is equipped with parallelization devices and flow diffusers (see e.g., elements P1 and P2 in FIGS. 5 and 8) which allow the harmonization of the pressure gradient(s) and speeds of the flow, the reduction of the non-axial turbulence which appears there; thus, "rear" thrust forces develop against the divergent walls of this third channeling part which are added to the counter-reaction forces of the entire fluid stream ejected into the surrounding fluid medium around and to the rear of the said mobile unit in the extension of its trajectory. The surface affected by these thrust and counter-reaction forces is that of the net rear ejection section of the entire fluid stream which is itself equivalent to that of the front inlet section, reduced by the low taper effect (see e.g., angle Co in FIG. 7) of the external "fuselage" envelope.

For this type of mobile units operating in a mixed environment whose separating surface between the two fluids is not stabilized (the case of marine environments mainly, but also rivers), this innovation also describes the addition to the constructive provisions already described, elements of structures for stabilizing and parallelizing the fluid flows inside the main tunnel created between the known conventional main shell of these mobiles and the outer shell with constant section or with low conicity disclosed. These complementary internal structures can be segmented and reproduced at several locations along the flow tunnel created along the mobile and "in particular" at the front and at the rear of said units (See ex., elements P10, P20, P1, and P2 in FIG. 5); these representations are not limiting.

These structures for stabilizing and parallelizing the fluid flows described, the general orientation of which with respect to that of the fluids external to the mobile unit can be inflected by controlled actuators, have the complementary role of participating in guiding the mobile by acting mainly on the trajectory of the fluids ejected at the immediate exit from the formed tunnel(s), creating a directional rudder effect with respect to the plane of the surface on which the mobile is moving. The "rear" structures disclosed, by their ability to orient the flow leaving the formed tunnel, can also allow the development of forces contributing to the "fore-aft" stability of the mobile as a whole (pitch effect), such as a rudder depth which makes it possible to control the "lift-off" balance of the entire mobile unit made up.

These parallelization devices can be improved, for example, by a set of steerable nozzles, controlled and/or servo-controlled and powered either by the main motorization devices, or by specific secondary motorizations.

The constructive arrangements of the 'rear' structure for parallelizing the flows at the exit of the internal tunnel(s) of the moving body constituted on the basis of the constructive arrangement disclosed, can also be applied to the 'front' parallelization structures, as a device for improvement of the guidance or steering efficiency of the entire mobile unit These parallelization and flow guiding devices, acting as deflectors, are in no way comparable to guide cones as described and claimed in patent US2013/0256459.

These flow parallelization devices internally or in "rear" ejection make it possible to:
- maximize the efficiency of the reaction effects of the outflow of the flows emitted by the propulsion components by notably reducing the effects of internal turbulence,
- reduce the overall rear drag of said mobiles by generating in the exit zones a flow whose "speed" gradient is optimized in order to and reduce the pressure waves generating turbulence and sound and/or thermal waves at the "rear",
- de-structure the pressure waves perpendicular to the direction of movement of the mobile units described, and
- maximize the propulsive efficiency of the said mobile units and
- reduce the turbulent, sound and/or thermal traces of the said mobiles described.

The operational 'front' section of the external cylindrical envelope formed around the known mobile incorporated to be adapted may be offset either forwards or backwards from the "extreme front tip" of the known mobile to be adapted and/or incorporated (see element D1 in FIG. 8), in order to optimize the capture of the "front" pressure waves developed by it to reduce the "external drag" developed by the assembly formed, from the "front" end of the external "fuselage" envelope, and make it tend towards zero. As claimed, this structure, correctly sized and positioned, has the role of channeling all of the fluid mass opposing the movement of said mobile unit in the surrounding fluid medium, (see this "front" shift D1 in FIG. 8).

All mobile units, whose internal shape of variable section, constituting the longitudinal channel or channels crossing them, would be adapted to the point of highlighting one or more prominent parts, projecting from the front of said mobile, Element B, known as integrated, beyond the net entry section as described, without notably disturbing the main "incoming" flow, captured by the net "Front" section of the external "fuselage" envelope, are admissible adaptations in "derogation" extension or variants to the principles developed in this patent application (see element in FIG. 10). In the case represented in FIG. 10, the "front" tip PAV prominent of the incorporated mobile object (here an airplane), to be acceptable and in conformity with the targeted aerodynamic efficiency objectives, supposes that the mobile considered is planned to generate only pressure waves contained in a cone going from the end of this tip to the front entries 3 of the longitudinal fluidic ducts, e.g., element 2 (see FIG. 10). In this case represented, the length D, as figured upstream of the entry 3, indicates a prominent "front" tip, the assumed maximum speeds of movement of the moving body would necessarily be "subsonic".

For a configuration such that the length D is zero or negative ("front" tip, set back, below the section 3), the assumed maximum speeds of movement of the mobile can be supersonic. The supposed aerodynamic efficiency of such a construction will only be mastered if the measurement sensors (e.g., sensor CPA in FIG. 7) of the frontal depression at the "front" perimeter (leading edge) of the fuselage envelope (see FIG. 7) gives information on the real frontal differential "depression" between the flows admitted into the internal longitudinal tunnels/channels and the surrounding external flow crossed. The control of the internal propulsion motorization will be used to limit the "economic" maximum speed of said constituted mobile unit.

To this family of known mobiles is added all the mobile units of new design whose propulsive efficiency is based on the implementation and operation of the so-called "tunnels and/or internal longitudinal channels, whether motorized or not, and the envelope of external section with low conicity or even quasi-constant" and in particular the mobile units designed as an assembly of claimed mobile units which can integrate several "solid bodies" embellished with one or more envelopes corresponding to the basic constructive arrangement disclosed. Said mobile units, variants of the basic mobile units claimed, are also generally claimed.

The mobile units disclosed by the addition of an "external casing with an outer section with low or even quasi-constant conicity" to the known mobiles, are a subset of a complete family disclosed of mobiles corresponding to the basic constructive provisions considered.

All the known and implemented mobile units of the said constructive arrangement "Motorized internal tunnel(s) under control of servos by depression sensor, outer section envelope with low conicity or even quasi-constant" disclosed, embellished with all or parts of the additional constructive provisions described are considered to have a new, innovative, claimed form contributing to their better dynamic propulsive efficiency in homogeneous or mixed fluid media of gaseous, hydraulic or mixed nature.

The devices for the convergence of the front "incoming" flows and the parallelization of the rear—"outgoing" flows are particularly important in order to allow an efficient, compact and innovative design of the whole of the "tunnel" device added to the already known forms of mobiles such as than automobiles.

See by way of non-limiting examples, for automobiles, FIG. 6, annotated with the same marks as in FIG. 2, the element 2 forming the wall of the internal channel is partly replaced by the exterior profile of the motor vehicle (element B) placed in an aerodynamic channel with an external section of low conicity or even quasi-constant, element 1. The "Front" section 3 of the envelope of constant "tunnel" section 1 encapsulating the vehicle B, according to the design effects sought, can be "more or less" inclined on the axis of said envelope; the "Rear" outlet section of the "tunnel" envelope 4 will be designed by integrating the air flow parallelization components P1 and P2 at the rear of the motor vehicle B. In the specific case of land vehicles (automobiles, trucks, etc., this "rear" parallelization device can be designed in such a way as to contribute to the grip of the said mobiles on the ground by inflecting from above the trajectory of the "rear" flow ejected so as to develop a specific force ground support; this force may be constant or be modulated by servocontrol or by piloting action.

The simplified formulations of the whole or of a characterizing part of the claimed innovative structures are, in all cases, presentations in subsidiarity of the present claimed global innovation.

The construction provisions described can also be applied to mobiles similar to mobile sets made up of compartmentalized mobile units attached to each other (e.g., wagons or cars). On this type of mobiles for which the overall length is much greater than the dimensions of the net section, the surfaces in contact with the laminar flow developed by the addition of a segmented external envelope, develop contact forces and braking (in laminar flow) such that the effectiveness of the device described could be called into question.

A new design of these modes of transport, developed for new lines and new transport networks not subject to size constraints, will make it possible to develop mobiles like mobile sets made up of compartmentalized mobiles attached to each other, with a "variant-derogation", relating to the principle of the low conicity of the external envelope (not applicable). In this application considered, this continuity will be segmented along the length of the modules (e.g., Wagons) constituting the whole of said mobile unit.

A constructive arrangement disclosed for this type of mobile with a very low conicity or quasi-constant external section by segments, integrating one or a plurality of internal aerodynamic tunnels, which can be segmented, consists in equipping this or these tunnels with propulsion means, placed in each of the modules of the segmented mobile, but also and preferentially in the tail segment, acting globally on the air vein(s) channeled by frontal low pressure suction, under the action of one or more "front" fan-compressor devices placed primarily at the front of the head module of the assembled assembly; their integration and their effectiveness is understood as being dependent on the "front" structure of the internal channel(s) to be supplied from the "entire front surface" of said unit.

A significant proportion of the adaptations of the disclosed devices applied to known mobile "vehicles", for obvious reasons of controlling their driving, in particular "direct vision" of the external environment, will be made at least partially, in particular laterally, in suitable transparent materials. This "transparent" constructive arrangement on the "Front" part and on the side walls of the casing forming the outer cylinder with very low conicity of the constituted mobile is an innovative variant of the claimed mobile units; it will be usefully complemented by a vision based on digital cameras which make it possible to overcome direct vision.

The segmentation by successive rings of fluid inlets staggered in steps of the external tunnel applied to known mobiles, is innovative as being an applied extension of the basic construction "external envelope with low conicity, or of quasi-constant section, associated with one or more multiple internal longitudinal fluid channels" disclosed.

This particular construction model which segments the fluidic inlets into successive bands or rings, or in a succession of inlets offset from each other, helping to control the flow of the fluid stream which opposes the movement of said mobile is a constructive arrangement, variant of the basic construction described above. FIG. 8 shows a front view and a side view of a known mobile, e.g., an "automobile", placed in a "duct-channel" whose input is segmented into two sub-channels made up, one smaller than the outer envelope, the other smaller than the first subchannel. The constituted assembly progressively channels the aeraulic flows presenting themselves frontally to the known base mobile and participates in the definition of the new disclosed mobile unit.

The constructive variant in successive strips or rings staggered in steps, breaking down the "channel" inlet of the mobile unit thus designed into associated elements, is applicable to rigid and/or deformable semi-rigid or flexible structures whose shaping definitive by "forward" pressure effect takes place automatically from a pressure and/or speed threshold, the two being linked according to the laws of fluid mechanics. This type of deformable channeling inlet structure, in the form of superimposed flexible ducts, consisting of enveloping membranes interconnected by flexible partitions, associated, to globally form a segmented "channel" inlet of the mobile or multichannel unit, is also described as innovative.

Considering this constructive variant of segmented "channel" input also induces a constructive variation of the descending part of said channel which can be built either in as many sub-channels as there are segments in the channeling input, or in descending sub-channels, which can be of different lengths, which group together the streams of several "input" segments as described above. This constructive arrangement developed by experimentation, which does not call for the use of internal motorization devices, (the propulsive force being external), nor for servocontrol by depression sensors (e.g., sensors CPA in FIG. 7), as a variant innovative as described, is also claimed.

The claimed elongation of motorizations for aeraulic applications is transferable, in principle, to motorizations for hydraulic or mixed applications.

Set of Mobile Units characterized in that they comprise a relatively thin external sheath "envelope" 1 (see diagrammatic, non-limiting examples) in which is fixed one or more objects B of known or new shapes and configurations (non-limiting examples: boats or automobiles, or others); the outer surface of said sheath defining the outer envelope 1 of said mobile unit, and the inner surface of said sheath defining, with the outer surfaces of said known incorporated object(s) B, said inlet, intermediate and output of said at least one internal channel; the said internal channels thus formed can be incidentally equipped with a plurality of motorization devices AF (examples: flow accelerators, parallelization P1, P2) of the entering fluid FE1 and/or leaving FS. The object or objects B, fixed internally, constitute in these sets, a particular or synthetic embodiment of the compartments as claimed; they can be used as a support for their own internal motorization, the action of which can develop in the said internal channels constituted by controlling the flows opposing the advancement of the said mobile units and/or, incidentally, on supports other than the surrounding fluid, in particular on the ground in the case of incorporation of objects B, which can be, without limitation, motorized mobiles such as cars, trucks, motorcycles, motorized bicycles (e.g., surmounted by a cyclist included in the outer envelope form). The parallelization devices of the flow crossing, ejected, are characterized to be able to participate in the improvement of the adhesion to the ground of said vehicles; in this specific case, the "rear" ejection of the crossing flow will be deflected by fixed or controlled devices which direct said flow "upward" by developing an additional counter-reaction force on the ground. This constructive arrangement and those which are an obvious translation of it (e.g., development of lateral guiding forces) are also claimed.

Mobile units characterized in that said at least one internal channel comprises a plurality of successive input portions 3, forming sub-channels, arranged in an overlapping and stepped manner from the most upstream end of the object B incorporated, towards both said outer envelope 1 and the downstream 4 of the mobile unit which can go beyond the termination of the object B incorporated (see example, automotive in FIG. 8). Said "sub-channels" can be arranged in such a way as to allow merging of the admitted streams, so that the number of "incoming" stream portions is not necessarily equal to the number of "outgoing" stream portions, whereas the entire/of the "outgoing" flows is equal to the total of the "incoming" flow(s).

Mobile units developed for applications in the aeronautical field, such as they incorporate "long" motors, not compact, which directly or indirectly drive "turbines" which allow the development of the electrical resources necessary for the indirect drive of "fans".-front compressors" described and the desired internal additional functions.

These mobile units are characterized in that the indirect drive described above, not necessary in the very compact engines of known aircraft, in operation to date, whose engines are offset under the wings, proves necessary for configurations single or multiple internal longitudinal fluidic channels that do not have a continuous linear axis that support each of their three-dimensional definition. These indirect drives can be developed in electric or hydraulic mode.

In the claimed mobile units incorporating a mobile known from the prior art, the drives of the "flow accelerators" as described and claimed are almost all indirect of the same nature as those described above and claimed.

Mobile units applied to the aeronautical and/or space fields, but also hydraulics, characterized by the incorporation into one or more surfaces of the external "fuselage" envelope, and more precisely, in aeronautics, into the said "ventral" face of the said units comparable to aircraft, "flat boxes", completely integrated into the volume contained in the external "fuselage" envelope, developing either on specific surfaces, or on the entire ventral face, pressurized and temporarily powered by the transverse fluidic channels described, either fed by air boosters, provided with a multitude of fluid exhaust points, regularly distributed, acting as mini or micro-nozzles whose overall action results in a vertical surface thrust (e.g., element P in FIG. 11) which makes it possible to compensate for the lack of lift observed at low speeds of said mobile units. This characterizing specificity, claimed, pushed to the limit of its potential technical possibilities, gives the said mobile units an ability to perform a vertical takeoff, which is completed by a setting in attitude at a positive angle sufficient to engage the priming of an aerodynamic slip which develops, by increasing the horizontal speed, the lift effects necessary to initiate a real controlled take-off, without having to resort to the use of wheel sets. Mobile units, applied to aeronautics, characterized for carrying out a take-off relying on a "zoned" set of pressurized ventral boxes, not having wheel sets as known and operated, are claimed to be new.

Piloting and control techniques, "in particular" computerized, make it possible to initiate a mini-take-off phase which is based on the said flat boxes, relayed by an aerodynamic take-off which develops by taking support, at increased progressive speed, on the ventral planar part of the outer fuselage envelope which generates the necessary lift forces.

The mobile units, applied to aeronautics, and more specifically comparable to helicopters and other flying taxis (known as VTOL), in the specific innovative technique proposed, include (ex., FIG. 11):

an external "fuselage" envelope, designed with a "flat" ventral surface and symmetrical lateral profiled shapes (element CPL), developed above the longitudinal "barycenter" line of the transverse sections of the constituted mobile unit, one or more internal longitudinal channels (in FIG. 11, representation with two motorized internal longitudinal channels), the motorizations of which, beyond two, can be differentiated, either thermal or electrical, one or a plurality of internal "transversal" channels connected on demand "upstream" to one or more longitudinal channels by high-flow valves (element VGD), immediately after the so-called high-pressure motorization zones, "downstream" to pressurized boxes (element CPP), supplied specifically by piloting and/or servocontrol, distributed, on all or part of the flat ventral surface of the external "fuselage" envelope, which develop thrust forces perpendicular to the flat ventral surface, with a vertical "upward" tendency, allow the implementation of upward forces whose efficiency can be modulated according to the powers of the fluxes admitted therein.

On the lower specific surfaces of the symmetrical profiled lateral shapes (element CPL) described, which develop oblique thrust forces (element PL), with an upward component, and/or directional, offset with respect to the main vertical axis of said unit which generate an overall "directional" rotational torque thereof.

The motorized longitudinal fluidic channels, which do not contribute to the development of upward forces, are put on hold for solicitation to develop the maximum horizontal propulsion forces; the motorized longitudinal fluidic channels connected on demand to the transverse fluidic channels are solicited sequentially first to first develop the lift-off forces and then contribute to the initiation of the horizontal propulsive forces.

Thus constructed, said mobile units can be directed effectively in all directions and retain their aerodynamic efficiency in reduced drag when the maximum propulsive power is required for the longitudinal fluidic channels, while the power absorbed by the "transverse" internal channels is not necessarily reduced to zero. The stability in terms of maintaining the attitude of such units is obtained by developing specific shapes of the external "fuselage" envelope equipped with zones provided with said pressurized boxes such that the forces which they allow to develop find a barycenter located above the "possible" point of reversal of said unit on itself.

These characterizing features described for mobile units developed in the aeronautical field can, for those skilled in the art, on mobile units as claimed, be equipped with propulsion "flat box" zones, adapted, and carried over into the fields of hydraulic applications, in particular as an improvement to the previously described or even conventional guiding devices:
- either on boats or so-called surface mobiles, by development of horizontal lateral forces in areas located below the waterline,
- either on "submarines" and all mobile of the same category by development of multidirectional lateral forces,
- the said boxes, in these applications, are also fed in a controlled manner and slaved to the central control device, by pressurized flows deflected from the main longitudinal flows described, conducted in internal "transverse" channels.

This technical particularity, described above, can also be characterized by a zoning of the pressurized boxes described above, such that the thrusts developed by these zones are differential and controlled which, in aeronautics, allow a setting in positive attitude angle almost instantaneous, allowing immediate acceleration on the "ventral" air gap caught between the ground and the "flat" ventral face of the external "fuselage" envelope, while the installed motors are operated at full power.

The technical particularity set out above: "zoning of the flat ventral face" of the external "fuselage" envelope of the said mobile units, can also be characterized by a controlled adaptation of the latter and taken advantage of in the take-off phase, to develop new capabilities applicable in the landing phase.

Said new mobile units, without undercarriage, are also characterized by ground supports, multiple, low height, totally retractable, piloted, which, in deployed mode, ensure static stability and give the entire ventral surface concerned by the said pressurized boxes an initial positioning which, by retraction combined with their pressurization, allows the instantaneous start of phases of setting in horizontal movements, at low speed (slow 'airport' positioning), then in accelerated movements at increasing speeds take-off in "slid" mode on the fluidic cushion developed by the said pressurized boxes put into action.

The technical capacity as claimed to develop mobile units without "wheel sets" and with very fast take-offs and landings, on air and/or fluid cushions at increased, controlled, and piloted pressure, makes it possible to significantly reduce the length of the runways of "take-off-landing" and therefore the impact, in particular ecological, of the footprint in net surface area on the ground of airports.

This characterizing specificity, pushed to the limit of its potential technical possibilities, gives said mobile units an ability to perform a partial and limited vertical take-off.

The efficiency, on a low height, of this take-off, may prove sufficient to reduce or eliminate the technical demand linked to the use of wheel sets.

The techniques of piloting and enslavement in particular computerized, applied to this configuration, allow:
initially in the take-off phase, a switchover of part of the internal fluid flows supplied by part of the engine power installed in the main fluid channels of the said mobile units towards the said transverse fluid channels which supply the said flat boxes,
then gradually, the full power supply to the "rear" main outlets, which develop the thrust necessary to engage a horizontal gear take-off which, itself, makes it possible to increase the proper lift forces of the said claimed units (due to the fact that part of the outer "fuselage" envelope, in particular the ventral one, is "flattened or very flattened, or even totally flat"),
while at the same time the power required to supply the said flat boxes is gradually reduced as the speed increase ensures that the said mobile units develop a lifting force which increases (to the square of the speed), such that gradually the ventral surface thrust effect, developed by said pressurized flat boxes, is less and less necessary and can be reduced to "zero".

These characterizing features described for mobile units developed in the aeronautical field can, for those skilled in the art, be adapted and repeated in fields of application such as
land vehicles moving on air cushions
marine vehicles (e.g.: pocket or defense submarines, jet-skis, so-called 'outboard' boats, etc.), "in particular" for improving guidance devices.

This "pressurized flat box" device can be improved by zoning the surfaces on which they can be formed, such that the thrusts developed by these zones are differential and controlled.

Thus, for mobile units applied to aeronautics, in the take-off phase, the surface pressure developed by flat boxes known as the 'front' zone' of the ventral surface, and therefore the corresponding thrust can be 'increased' whereas the vertical thrust required of other flat boxes, known as the "rear" zone can be relatively reduced. The differentiation of the ventral thrusts by 'zones' makes it possible to immediately give the said mobile units a positive attitude which improves the capacities for rapid, even very rapid, take-off.

The exploitation of this device "pressurized flat boxes" incorporated in the ventral face of said outer envelope for flattened or even very flattened shapes (aeraulic-aeronautical applications) which offer new possibilities in terms of "fast" take-off and landing allows the design of mobile units which can be implemented without having recourse to wheel sets, "in particular" foldable in said mobile units.

Indeed, the immediate positive attitude of the said units, as they gain horizontal speed, allows the very rapid, aerodynamic engagement of a "ventral" air gap which is introduced below the mobile unit, by ground effect, in the form of an "air cushion" whose thickness increases very rapidly taking into account the initial pitch attitude and the progressive increase in horizontal speed, which can be very rapid taking into account overall aerodynamic specificities described above.

The technical particularity set out above can be translated into a controlled adaptation of the latter which allows the development of new capacities applicable in the landing phase.

Indeed, the ventral surface zoning described above also makes it possible to ensure that said mobile units have the ability to present themselves at a low height, when landing, with a controlled positive attitude, first on a fluid cushion (of air) 'thick' aerodynamics by lift effect, then gradually as its thickness decreases by loss of altitude and by loss of lift linked to the reduction in speed, compensated by a progressive hardening of this cushion "fluidic" by the fluid supply of increased surface pressure, emitted by the said pressurized ventral chambers, until the terminal phase of the landing; this landing can be extended by a possible horizontal displacement in 'slipped' mode on a fluid cushion activated by the so-called "pressurized ventral chambers".

The concept of developing differentiated "ventral" thrust forces, linked to the implementation of flat, ventral, pressurized boxes equipped with micro-nozzles which eject a controlled and controlled flow, under pressure, emitted temporarily by the central motors, leads by the internal "transverse" fluid channels, allows lightening of structures, weight, design of said mobile units, regarding the "removal of said wheel sets". This new technical potential is also reflected in overall energy efficiency linked to the elimination of a device as heavy and cumbersome as the wheel sets.

It should be noted, however, that the removal of the support points on the ground represented by the wheel sets highlights the need to replace them with simple and retractable support points which make it possible to give said mobile units static stability; to do this, said mobile units can be characterized by multiple supports of low height, totally retractable, piloted, which come to support the mobile unit when it is stationary (zero horizontal displacement). These supports, in deployed mode, moreover, make it possible to ensure, for the entire ventral surface concerned by said pressurized boxes, an initial positioning such that as soon as they are pressurized all the micro-nozzles they carry can be operational, authorizing the start of the horizontal movement phases at low speed (slow 'airport' positioning, supports described above 'retracted') by temporary lateral forces, generated by pressurized flat boxes developed on the side faces of the external "fuselage" envelope.

This technical specificity, pushed to the limit of its potential technical possibilities, gives said mobile units the ability to carry out a mini vertical take-off, which is completed by setting the attitude at a positive angle sufficient to initiate the initiation of a aerodynamic slip which develops, by increasing the horizontal speed, the lift effects necessary to initiate a real controlled take-off, without having to use wheel sets.

The technical capacity as claimed to develop units, without "wheel sets" and with very fast take-offs and landings, on air and/or fluid cushions at increased, controlled, and piloted pressure, makes it possible to reduce the length of the airport take-off and landing runways. This new technical potential, applied to mobile units of the claimed aircraft type, also translates into increased overall energy efficiency, linked to the elimination of an important device such as the wheel sets whose "dead" weight, useless in the flight phase. after take-off, is penalizing in terms of 'lost' net payload and "relative increase in the volume of the cabins which house them", all along the routes taken, the lifetime of the 'known' aircraft thus equipped.

This technicality explained above, globally innovative, allows the development of mobile aeraulic, aeronautical units called "without wheelset" whose "economic" interest is obvious: weight gain, space saving made available, consumption gain of fuel, for the entire life of the said mobile units thus constituted.

The claimed mobile units can be designed to be operated in the aeronautical and space fields, "in particular" for: supersonic, stratospheric, suborbital flight travel speeds, up to the limits of space flight, including the functionalities for a suborbital launch, see space, develop sequentially as follows:

a) horizontal take-off using
   a specific multi-channel configuration such that the external "fuselage" envelope i can be split into sub-envelopes, each of which is built to have the basic characteristics described, in programmed stages and such that single-channel sub-assemblies are provided that can be detachable during flight, after selective intensive "first" use which favors the central structure for the continuation of the launch; the first launch phase is ensured by the single-channel modules farthest from the central module carrying a satellite or a space shuttle; these modules are planned to be provided with pressurized "boxes" zones supplied by the transverse internal channels described, they allow the progressive horizontal take-off of the constituted assembly; they are also designed with an autonomous piloting device which allows them to return to the landing zone to enable their reuse;

the technical devices claimed above embellished with components specifically developed for a "single" fixed and/or removable take-off immediately after use; are designed to be reusable.

b) then in a piloted trajectory, optimized ascent, by use of the maximum thrust developed by the combination of the external "fuselage" envelope described and claimed, of the channeling frontal inlet used at full section in low pressure mode, of the channels motorized internals, new elongated motorizations claimed and adapted; piloting is ensured by "flat box" modules distributed in an optimized manner on the external "fuselage" envelope of the central mobile unit, supplied by specific "transverse" fluidic channels.

The first stages of such a launch rely on atmospheric engines as described above, in subsonic mode and in supersonic mode, then in stratospheric mode, when the quantity of oxidizer (oxygen) required engaged by the frontal entry, to ensure the continuity of the "conventional" propulsion, becomes insufficient (in very high atmosphere, or in the stratosphere) and that must be put in implement improved means of propulsion, for example by injecting pressurized oxygen on board and a more efficient adapted propellant, then, in suborbital mode, when the frontal resistance which opposes the displacement of the said units tends towards zero, the continuity of the propulsion is relayed by specific adapted space propulsion devices, connected to the launched module until it reaches its destination trajectory.

at the end of the suborbital trajectory, the central mobile unit, still connected to the launched module, is reactivated to initiate the slowing down phase by the action of pressurized boxes specially designed for this purpose, and the descent and landing phases of the "mobile unit" set constituted.

Said mobile units, for this use, in the first "atmospheric" phases of take-off do not carry any specific "oxidizer" since they use the oxygen of the surrounding air crossed and are therefore lightened accordingly compared to suborbital launchers or known spaces. The propulsive efficiency of said units develops over their entire "rear" section and predisposes them to a claimed "launcher" type use.

The passage from supersonic mode to stratospheric mode then to a "suborbital" mode is done thanks to a progressive injection into the primary motorization devices, of compressed air (which can be onboard in the liquid state) or onboard pure oxygen (at very high pressure, or in liquid state), or another specific oxidizer on board. In this "suborbital" mode, the fluidic stress linked to the frontal resistance of the surrounding environment tends towards zero and the mobile unit operated under these conditions can be progressively likened to a spaceship.

In the transitory phase of passage from the stratospheric mode to the "suborbital" mode, specific thrusters developed for the "space" domain can be gradually put into action; their gaseous ejection nozzles can be designed in simple or even obvious connections with the termination of the second part or the beginning of the third part of the claimed "longitudinal" fluidic channels of the launcher "central mobile unit" module.

Said claimed mobile units, designed to ensure a "discreet" passage from subsonic to supersonic modes, then stratospheric mode, then to "suborbital" mode, are equipped with all the guidance functionalities developed by the use of secondary "transverse" channels such as described and claimed, the exhaust nozzles of which end along the external "fuselage" envelope and make it possible to develop lateral forces put to use in order to develop and follow an imposed trajectory.

Said claimed mobile units, applied to the space domain, can integrate a specific mobile known or to be developed, positioned by taking inspiration from the claimed insertion of an object B, designed to detach from the base unit, main, by the appropriate implementation of undocking devices; the said integrated mobile becomes at the end of the launch the propelled "spaceship". In this "spatial" operating mode, said basic, main units will be designed, in a "multi-channel" version, to be able to be segmented into independent modules which can be detached, in programmed steps, from the central module which incorporates the object B designed as "space module". Each of the detachable independent modules can be part of a final complementary phase of redirection piloted on land or at sea, for a later reuse operation.

The technicality exposed above, allows the development of new mobile units, reusable, economical, adapted to astronautical launches, claimed.

Mobile Units conforming to the technical points set out above, characterized for being variant embodiments, in derogation of the shapes and claimed devices for improving aerodynamic (or aeraulic) or hydrodynamic performance, which are equipped with "necessary" accessories or optional, for permanent or temporary use, fixed or retractable mounted (folding back into the external "fuselage" envelope 1, such as (see FIG. 10):

wings, rudders, and ailerons (schematic examples: elements AR and G in FIG. 10, sets or ground support devices (schematic examples: element TR), side ejection nozzles, see perpendicular to the external "fuselage" envelope of part of the "incoming" flow captured in one or other of the parts of the internal channel(s), before or after motorizations, remote-controlled, to provide augmented guidance functions, as necessary (schematic examples: elements TG1, TG2 and G, sensors projecting from and outside the outer casing (1) (examples: image sensors (cameras, etc.), temperature, speed sensors, etc.); these sensors can be placed in any useful and judicious position, devices, retractable or not, and incorporated which allow the initiation of a movement perpendicular to the main longitudinal axis of the said mobile units, devices for temporary or permanent, total or partial protection of all the front entrances of said mobile units against objects carried by the incoming flow (e.g., element FEA in FIGS. 9 and 10) (non-limiting examples: in the air (birds), in the water (fish, floating objects), activated automatically under the impulse of appropriate detectors or under appropriate steering actions. These protections are adapted according to the surrounding fluid environments crossed and the risks represented by the objects to be moved away from the trajectory to be taken by the said mobile unit(s), which incorporate some or all the devices mentioned above or equivalent, considered to be useful, and/or necessary for those skilled in the art, are also claimed.

The Mobile Units conforming to the technical points exposed characterized to be extrapolated realizations of said main technical points exposed (one or more) and whose operation is based on a plurality of basic objectives sought:

conduction, in one or more channels of almost all the frontal fluid vein opposing the displacement of said units, the frontal flow captured by an appropriate motorization of the said 'channels', which is possibly slaved to differential pressure sensors arranged at the entrance of the said channels, of "minimal" external peripheral drag as claimed by the functional constitution of an "external fuselage" envelope of slightly conical or quasi-constant section are also claimed.

Fields of Application

The innovative construction of mobile units with an external "fuselage" envelope and motorized internal channels, as described above, leads to innovative designs.

Totally new mobile units specific to the aeronautical, astronautical, maritime, submarine, land transport, sports equipment (clothing) fields, "Known" mobile units whose technicality is established in all fields of practical application, adapted, or readapted on the basis of the construction principles proposed and described, in aeronautics, the maritime sector, means of land transport, . . . (non-exhaustive list). The constructive provisions described above in segmentation of the "channel" entry are applicable:

To known mobiles already listed, adapted, modified to incorporate an outer envelope, in particular mobiles resting on the ground (cars, trucks, etc.) whose traction of known initial design (for example by motorized "wheel sets") can be stored as such or adapted to a distribution of energy towards the Rep AF flow accelerators, described above, themselves controlled (or not) by a servo-control conducted on the basis of frontal "vacuum-pressure" information "front" provided by Rep CPA type sensors described or functionally equivalent.

Has equipment worn or arranged in skins such as "tracksuits",

Has all known scale models, including toys, adapted by an implementation of the innovative designs described.

The invention claimed is:

1. Motorized mobile units, other than an airship, comprising of inseparable sub-assemblies:
   an outer fuselage envelope with a length greater than a net transverse dimension of the outer fuselage envelope;
   at least one motorized internal longitudinal channel and a plurality of motorized internal longitudinal fluidic channels longitudinally crossing the mobile units and incorporated into a volume of the outer fuselage envelope, so as to ensure an internal circulation of a fluid opposing a frontal movement of the mobile units, said at least one motorized internal longitudinal channel or each motorized internal longitudinal fluidic channel being equipped with one or more motorization devices, supplemented by an upstream equipment and a downstream equipment, controlled so that speeds and pressures of an overall flow of the fluid leaving said at least one motorized internal longitudinal channel are greater than speeds and pressures of an incoming flow, each of said plurality of motorized internal longitudinal channels presenting, successively, in a direction of the internal circulation of the fluid;
   a set of input portions of convergent sections, a set of intermediate portions of constant section, and a set of final output portions of divergent sections, and an inlet portion of the converging sections in said at least one motorized internal longitudinal channel comprising:
      fan-compressors in aeraulic applications or flow accelerators in hydraulic applications; and
      differential pressure sensors, between the incoming flow and an external surrounding flow, mounted on a front leading edge separating between the external surrounding flow and a flow admitted into said each motorized internal longitudinal fluidic channel;
   each intermediate portion comprising:
      propellants from said one or more motorization devices acting directly on a fluid stream channeled by said each motorized internal longitudinal fluidic channel and positioned along an intermediate portion of said each motorized internal longitudinal fluidic channel; and
      a longitudinal channeling secondary envelope, which conducts internally, around each motorized fluidic vein, a concentric, damping flow, extending at least over an entire length of said each intermediate portion of said each motorized internal longitudinal fluidic channel;
   each final output portion located downstream of said each motorized internal longitudinal fluidic channel of the mobile units, extending from an exit of a corresponding intermediate portion to a rear end of the outer fuselage envelope, and
   comprising:
      energy sensor devices;
      diffusers; and
      parallelizers of a flow leaving the corresponding intermediate portion and of a flow channeled by a corresponding longitudinal channeling secondary envelope;
   a plurality of non-motorized transverse internal fluidic channels connected at a request of a controller, upstream to said plurality of motorized internal longitudinal fluidic channels at a height of an output of the motorizations devices of said plurality of motorized internal longitudinal fluidic channels or after the energy sensor devices, opening downstream into specific surface areas of the outer fuselage envelope to ensure therein a controlled distribution of flows picked up from said plurality of motorized internal longitudinal fluidic channels and to develop therein controlled lateral thrust forces;
   wherein said plurality of non-motorized transverse internal fluidic channels link in a completely internalized manner in the outer fuselage envelope, paths between upstream and downstream ends of said plurality of non-motorized transverse internal fluidic channels comprising variable sections linked to a flow rate of the flows that must be driven by said plurality of non-motorized transverse internal fluidic channels; and
   a set of available internal volumes between the outer fuselage envelope and a totality of internal volumes occupied by said plurality of motorized internal longitudinal fluidic channels and said plurality of non-motorized transverse internal fluidic channels, and their associated functional equipment structured in sub-technical sets for operating said mobile units.

2. The mobile units of claim 1, wherein the motorization devices of said each motorized internal longitudinal fluidic channel are elongated or with integrated motors, and are placed directly in the corresponding motorized internal longitudinal fluidic channel or in compartments arranged laterally thereto, each motorization device comprising:
   a front turbine, a pump, or a combination of the front turbine and the pump to generate an incompressible traversed surrounding fluid, thereby to provide an effect of flow accelerators;
   an accelerator-compressor acting on a frontal fluid vein entering at a front of said each motorized internal longitudinal fluidic channel to provide a compressible surrounding fluid;
   an accelerator motor acting on a fluid stream in transit in the intermediate portion of said each motorized internal longitudinal fluidic channel; and a turbine-diffuser-expander-and parallelizers acting on the fluid stream ejected from the final output portion of divergent section of said each motorized internal longitudinal fluidic channel.

3. The mobile units of claim 1, wherein, for aeraulic applications, said at least one motorized internal longitudinal channel or said each motorized internal longitudinal fluidic channels comprise one or more elongated motorization devices extending over the entire length of a corresponding intermediate portion of said each motorized internal longitudinal fluidic channels; and wherein the aeraulic applications being aeronautics.

4. The mobile units of claim 1, wherein said at least one motorized internal longitudinal channel or in a corresponding output portion of said each motorized internal longitudinal fluidic channels comprise a plurality of parallelization devices to control motorization flows to optimize a rear propulsive efficiency by slowing down the fluid by: parallelization of fluid streams being ejected at a rear of the mobile units providing a diffuser effect, minimizing turbulent and thermal energy losses; and optionally installing the parallelization devices in the input portions of said motorized internal longitudinal fluidic channels in application to hydraulic or mixed media.

5. The mobile units of claim 1, wherein:
the outer fuselage envelope comprises a plurality of motorized internal longitudinal channels with different lengths and parallel to each other;
a front inlet section of the outer fuselage envelope is equal to a sum of the input portions of said plurality of motorized internal longitudinal fluidic channels of a multi-channel construction and an output section of the outer fuselage envelope is equal to a sum of the output portions of said plurality of motorized internal longitudinal fluidic channels;
a number of incoming motorized internal longitudinal fluidic channels is different from a number of outgoing motorized internal longitudinal fluidic channels allowing intermediate flows of said incoming and outgoing internal longitudinal fluidic channels to mix and be associated; and
said plurality of motorized internal longitudinal fluidic channels are subdivided either into secondary longitudinal fluidic channels whose corresponding controlled flows contribute to permanent effects of at least one of thermal and acoustic insulation, or into secondary transverse fluidic channels, connected on demand, downstream of engines, which allow a development of lateral forces controlled on specific surfaces of the outer fuselage envelope.

6. The mobile units of claim 1, further comprising a leading edge for an entry of the fluid into said each motorized internal longitudinal fluidic channel or a set of leading edges for said plurality of motorized internal longitudinal fluidic channels; wherein for each leading edge:
an angle formed between a profile of the outer fuselage envelope and a profile of a first channeling part of said plurality of motorized internal longitudinal fluidic channels is a minimum of 5 degrees; and
a front edge of said each leading edge is not necessarily perpendicular to a longitudinal axis of the mobile units and has a non-linear or sinusoidal profile.

7. The mobile units of claim 1, further comprising at least one compartment or a plurality of compartments structured between the outer fuselage envelope and said at least one motorized internal longitudinal channel or said plurality of motorized internal longitudinal fluidic channels and said plurality of non-motorized transverse internal fluidic channels to form: a steering or trajectory control cell and technical compartments; and wherein all compartments are thermally, acoustically and vibratory insulated from motors and internal fluidic channels.

8. The mobile units of claim 1, further comprising an outer sheath envelope in which is fixed one or more incorporated objects, which can be motorized, the outer sheath envelope comprising:
an outer surface of the outer sheath envelope defining an outer fuselage contour of the mobile units;
an inner surface of the outer sheath envelope defining, with outer surfaces of said one or more incorporated objects, an input portion, an intermediate portion and an output portion of at least one motorized internal longitudinal fluidic channel;
a motorization device associated with said one or more incorporated objects participates in an acceleration and circulation of a fluid flow from a front of an internal channel formed to a rear thereof by the flow accelerators.

9. The mobile units of claim 8, wherein said at least one motorized internal longitudinal fluidic channel comprises a plurality of successive inlet sections, forming sub-channels, arranged in an overlapping and stepped from a most upstream end of said one or more incorporated objects, towards both said outer fuselage envelope and the downstream of the mobile units which can go beyond a termination of said one or more incorporated objects.

10. The mobile units of claim 1, wherein a subset of or all of said plurality of motorized internal longitudinal fluidic channels incorporates non-compact, soundproof motorizations, which directly or indirectly drive turbines that provide electrical resources to:
an indirect drive of the fan compressors;
drive electric motors of said plurality of motorized internal longitudinal fluidic channels; and
control devices.

11. The mobile units of claim 1, wherein a surface of the outer fuselage envelope comprises, in predetermined areas, flat boxes:
fully integrated into a volume of the outer fuselage envelope;
pressurized and supplied, on demand, either by diversion of a part of outgoing flows, captured after motorization, at high pressure, into said plurality of non-motorized transverse internal fluidic channels, or by air boosters, and
provided with a multitude of fluid exhaust points, regularly distributed, each acting as a mini or micro-nozzle, which locally and globally develop lateral thrust forces which are applied to said mobile units.

12. The mobile units of claim 1 are without wheelsets for take-offs and landings in vertical mode or in a slid tangential mode and is piloted on a pressurized fluidic cushion.

13. The mobile units of claim 11, wherein:
flat surface areas of the outer fuselage envelope being equipped with the pressurized flat boxes and fed by said plurality of non-motorized transverse internal fluidic channels, whose flows controlled on demand, develop on said mobile units lateral, directional and distributed thrust forces, the combinations of which effectively obtain effects of:
a vertical take-off, while flows produced by one or more of said plurality of motorized internal longitudinal fluidic channels are totally directed towards said plurality of non-motorized transverse internal fluidic channels;

a permanent guidance, by controlled activation of the pressurized flat boxes;

a progressive transfer of propulsive power available in a horizontal movement by controlled activation of motorized internal longitudinal fluidic channels not requested during the vertical take-off, or by progressive reduction of the flows implemented in said plurality of non-motorized transverse internal fluidic channels and by controlled redirection of the flows towards an exit of a motorized internal longitudinal fluidic channel which produce the flows; and a permanent or impulsive adjustment of trajectories traveled, by controlled activation of devices implemented for the vertical take-off and for an omnidirectional guidance.

14. The mobile units of claim 1, in aeronautical applications, passes from a subsonic mode, to a supersonic mode, to a stratospheric mode then to a suborbital mode by a progressive injection, from the stratospheric mode, of pure oxygen on board or of an oxidizer other than oxygen to the motorization devices, which are internal motor propulsion devices; and wherein in the subsonic and supersonic modes, the oxidizer, not on board pulsed in the external surrounding flow traversed is the oxygen of the air, so that the mobile units of a suborbital or space launcher are freed from carrying oxidizer in launch phases that consume much of the oxygen.

15. The mobile units of claim 1 are structured as an association of centrally piloted mobile units, made autonomous in stages, comprising:

central mobile units, for ultimate use, reusable or not;

the mobile units being laterally associated with the central mobile units, independent, mounted symmetrically with respect to a main axis of the central mobile units, detachable and recoverable, to form a mobile launch unit from:

one module to single use, detachable from the central mobile units, the mobile launch unit being a satellite or a space shuttle, the central mobile units being recoverable; or a transport cell at a suborbital altitude integrated to the central mobile units, provided for a rapid return to Earth; and wherein the mobile units assembled in a single launcher for a vertical take-off and landing in a slipped mode on a pressurized fluidic cushion.

16. The mobile units of claim 1, wherein the outer fuselage envelope comprises at least one of the following retractable equipment: wings, rudders, fins, temporary support devices on the ground, sensors protruding from and outside the outer fuselage envelope, retractable motorized devices to enable an initiation of a movement perpendicular to a main longitudinal axis of the mobile units, and device for temporary or permanent, total or partial protection of front entrances of the mobile units against objects carried by the incoming flow automatically operated under an impulse of a detector.

17. The motorized mobile units of claim 1, wherein a ventral face of the outer fuselage envelope is flattened.

18. The motorized mobile units of claim 1, wherein said energy sensor devices are turbines and associated electrical generators.

19. The motorized mobile units of claim 1, wherein the motorization devices are internal motor propulsion devices.

20. The motorized mobile units of claim 1, wherein a front section of the outer fuselage envelope is larger than a rear section of the outer fuselage envelope.

* * * * *